US012616172B2

(12) United States Patent
Oh

(10) Patent No.: US 12,616,172 B2
(45) Date of Patent: May 5, 2026

(54) SECOND SKIN PAW PROTECTORS

(71) Applicant: Second Skin Paw Protector LLC, Phoenix, AZ (US)

(72) Inventor: Kui Mi Oh, Phoenix, AZ (US)

(73) Assignee: SECOND SKIN PAW PROTECTOR LLC, Phoenix, AZ (US)

( * ) Notice: Subject to any disclaimer, the term of this patent is extended or adjusted under 35 U.S.C. 154(b) by 0 days.

(21) Appl. No.: 18/959,255

(22) Filed: Nov. 25, 2024

(65) Prior Publication Data

US 2025/0169470 A1 May 29, 2025

Related U.S. Application Data

(60) Provisional application No. 63/604,119, filed on Nov. 29, 2023.

(51) Int. Cl.
*A01K 13/00* (2006.01)

(52) U.S. Cl.
CPC ................................... *A01K 13/007* (2013.01)

(58) Field of Classification Search
CPC ..... A01K 13/007; A01K 13/006; A01K 13/00
See application file for complete search history.

(56) References Cited

U.S. PATENT DOCUMENTS

| | | | | |
|---|---|---|---|---|
| 6,526,920 | B1 * | 3/2003 | Griffin | A01K 13/007 54/82 |
| 11,297,800 | B2 * | 4/2022 | Paxton | A43B 13/223 |
| 2007/0039289 | A1 * | 2/2007 | LeCompte | A01K 13/007 54/82 |
| 2008/0149046 | A1 * | 6/2008 | Tsai | A01K 13/007 119/850 |
| 2011/0041779 | A1 * | 2/2011 | Hurwitz | A61D 9/00 119/850 |
| 2018/0242651 | A1 * | 8/2018 | Kelly | A41B 11/003 |
| 2021/0378213 | A1 * | 12/2021 | D'Angelo | B32B 1/00 |
| 2024/0188538 | A1 * | 6/2024 | Perella | A01K 13/007 |

* cited by examiner

*Primary Examiner* — Christopher D Hutchens
*Assistant Examiner* — Nevena Aleksic
(74) *Attorney, Agent, or Firm* — Snell & Wilmer L.L.P.

(57) ABSTRACT

Footwear configured to be worn by an animal is provided herein. The footwear can be a second skin paw protector including a body formed from a first material having a top, a bottom, a limb engaging portion, and a paw engaging portion. The paw engaging portion may define a protrusion dimensioned and shaped to receive one or more dog nails. The second skin paw protector may comprise ridges disposed along a limb engaging portion and along a first pad region to allow for flexibility and paw protection.

14 Claims, 18 Drawing Sheets

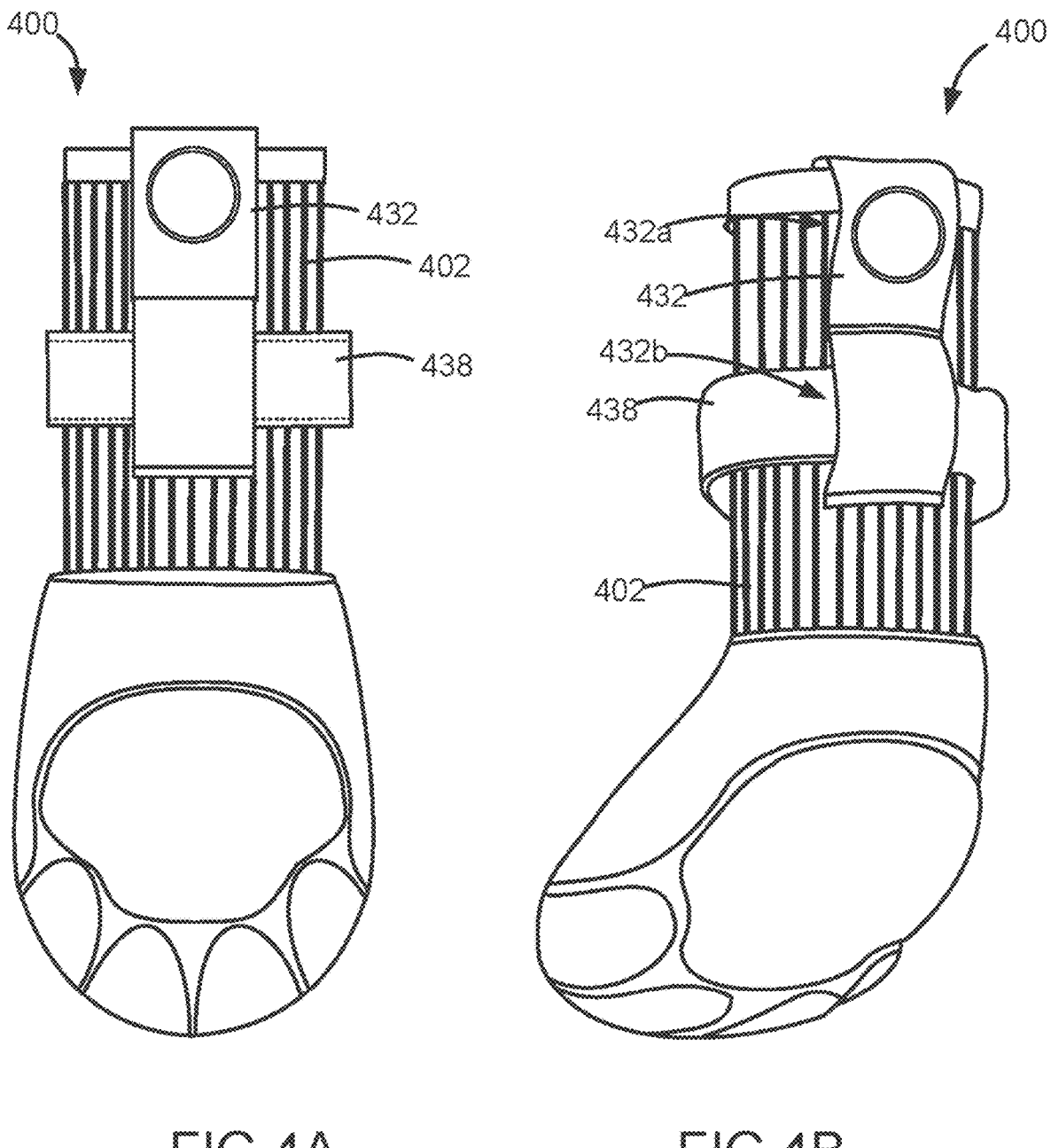
FIG.4A                 FIG.4B

400

402

438

400

400

416

Section C-C

Section A-A

Section B-B

1200

INSERT A DOG PAW INTO AN OPEN END OF A PAW PROTECTOR BODY — 1210

SECURINGLY ENGAGE THE LIMB ENGAGING PORTION TO A LIMB OF THE DOG — 1220

SECURINGLY ENGAGE THE PAW ENGAGING PORTION TO A PAW OF THE DOG — 1230

RECEIVE ONE OR MORE DOG NAILS INTO A PLURALITY OF OPENINGS DISPOSED IN THE PAW ENGAGING PORTION — 1240

1300

SECURE A STRETCHED PORTION OF THE SECOND
SKIN PAW PROTECTOR TO APPLICATOR — 1310

INSERT A DOG PAW INTO THE PAW PORTION
USING THE APPLICATOR — 1320

SECURELY ENGAGE THE LIMB ENGAGING
PORTION TO A LIMB OF THE DOG — 1330

SECURELY ENGAGE THE PAW ENGAGING
PORTION TO THE PAW OF THE DOG — 1340

RECEIVE ONE OR MORE DOG NAILS INTO A
PROTRUSION DISPOSED IN THE
PAW ENGAGING PORTION — 1350

SECOND SKIN PAW PROTECTORS

CROSS-REFERENCE TO RELATED APPLICATIONS

This application claims priority to, and the benefit of, U.S. Provisional Application No. 63/604,119, filed Nov. 29, 2023, and titled "SECOND SKIN PAW PROTECTORS," which is incorporated by reference herein in its entirety for all purposes.

FIELD

The present disclosure relates generally to coverings for animal feet (e.g., paws), and more particularly to footwear worn by dogs to protect their paws from hot, cold, wet, icy, rugged, rough, and slippery surfaces.

BACKGROUND

Placing footwear on pets may be highly desirable for protective, health, and aesthetic reasons. Pet footwear has become increasingly popular over the past few decades. Pet footwear has been predominantly used for dogs but is also contemplated for cats and other domesticated animals.

Pet footwear may be useful to mitigate discomfort that pets experience when standing, walking, or running on certain surfaces, such as rough surfaces or excessively hot or cold surfaces. Specifically, hot or cold asphalt and concrete, rough terrain, and areas with broken glass, nails, or other debris may cause discomfort or injury to the feet of animals. Rough terrain, for example, can cut or wear out the feet or digital/metatarsal/metacarpal pads of dogs. In other cases, it may not be safe for pets to traverse the ground when temperatures are particularly severe, such as in hot climates where the ground surface may be excessively hot (e.g., over 25° C.) or in colder climates where the ground may be frozen or icy. Pet footwear may also be useful to improve traction between a pet's foot and the ground, for example, on slippery or unstable surfaces such as ice, snow, loose gravel, sand, or wet surfaces.

Pet footwear may be desirable for other reasons. Pet footwear may be used when a pet has injured one or more paws. In such case, suitable footwear may help to protect the affected paw until sufficient healing has occurred. Pet footwear may be desired for fashion purposes and/or to prevent soiling of indoor floors when the pet returns from a walk. For example, in inclement weather, a person may not wish to clean a dog's paws after the dog has been outside. To keep interior floors clean, placing footwear on a pet may be easier and/or less costly than thoroughly cleaning the pet's feet and/or indoor surfaces.

Conventional pet footwear designs may not provide adequate durability to sufficiently protect a dog's paws from sharp objects on the ground, such as broken glass. Further, in instances where a pet is walking on hot pavement, many conventional pet footwear designs may not be configured to keep the pet's paws cool. Instead, many designs may trap heat within the footwear, thereby preventing the pet's paw from perspiring and/or keeping cool. Finally, many conventional pet footwear designs may not properly fit animal paws and legs. As a result, footwear may be difficult to put on the pet's foot and not well tolerated by the pet. Once on, the footwear may not stay on well. For example, conventional pet footwear may spin about the pet's ankle, diminishing the footwear's efficacy and potentially causing discomfort or injury to the pet. Other designs may disengage from the pet's paw as the pet walks or runs. There is a need, therefore, to provide a durable, breathable, and ergonomic pet footwear.

SUMMARY

In general, one aspect of the subject matter described in this disclosure may be embodied in an animal footwear, such as a second skin paw protector. The second skin paw protector includes a body formed from a first material having a top, a bottom, a limb engaging portion, and a paw engaging portion. The limb engaging portion defines an open end shaped to securely engage a dog limb. The paw engaging portion is dimensioned to securely engage a dog paw. The paw engaging portion defines a plurality of openings dimensioned and shaped to receive one or more dog nails.

These and other embodiments may optionally include one or more of the following features. The bottom can have a metacarpal/metatarsal pad region and a digital pad region. The second skin paw protector can further include a polymer material layer bonded to the bottom of the body and located at the metacarpal/metatarsal pad region and the digital pad region so as to create a slip resistant pad positioned on the bottom of the body. The polymer material layer can wrap around a toe end of the paw engaging portion. The plurality of openings can extend through the polymer material layer. The polymer material layer can be made of silicone.

The first material can be a resiliently stretchable fabric material. The body can be an elongated tubular body. The second skin paw protector can further include a wrapping member coupled to the body at the limb engaging portion. The wrapping member can be configured to wrap around the dog limb. The second skin paw protector can further include a loop sewn to the body. The loop can be configured to receive the wrapping member therethrough. The second skin paw protector can further include a cinch cord sewn at least partially into the limb engaging portion of the body. The second skin paw protector can further include a plurality of vent holes disposed in the top of the body.

The first material can be formed from at least twenty percent spandex.

The plurality of openings can include a center opening dimensioned and positioned to receive a first dog nail and a second dog nail, a first side opening configured to receive a third dog nail, and a second side opening configured to receive a fourth dog nail. In various embodiments, each opening of the plurality of openings can be dimensioned to receive only a single dog nail. Each opening of the plurality of openings can be at least partially disposed in the bottom of the body. Each opening of the plurality of openings can extend from the top of the body to the bottom of the body. The plurality of openings can be equidistantly spaced around a toe end of the paw engaging portion. A center opening of the plurality of openings can be dimensioned and shaped to receive two dog nails.

In another aspect, the subject matter may be embodied in a pet footwear, such as a second skin paw protector suitable for insertion and removal of a dog paw and providing an operatively protective covering about said dog paw. The second skin paw protector includes a body including a toe end defining an opening dimensioned and shaped to accommodate one or more dog nails when the second skin paw protector is worn by a dog.

In another aspect, the subject matter may be embodied in a pet footwear, such as a second skin paw protector suitable for insertion and removal of a dog paw and providing an operatively protective covering about said dog paw. The second skin paw protector may include a body monolithically formed from a first material and comprising a proximal end, a distal end, a limb engaging portion, and a paw engaging portion. The limb engaging portion may be disposed at the proximal end and may define an interior volume configured to engage a dog limb. The paw engaging portion may be disposed at the distal end and have a protrusion configured to receive at least one dog nail. The limb engaging portion and the paw engaging portion may join at a non-parallel angle.

The second skin paw protector may be defined by an elongated tubular body comprising an open end and a toe end. The elongated tubular body may comprise the limb engaging portion and the paw engaging portion. The paw engaging portion may comprise a toe garage (also referred to herein as a protrusion) dimensioned and shaped to receive at least one dog nail. The elongated tubular body may substantially comprise a first material. The first material may be a resiliently stretchable polymer or co-polymer. The first material may be Styrene-Ethylene-Butylene-Styrene (SEBS).

These and other embodiments may optionally include one or more of the following features. The second skin paw protector may comprise a plurality of first ridges along the limb engaging portion.

The second skin paw protector may comprise a first pad region disposed on the paw engaging portion. The first pad region may comprise a plurality of second ridges on an outer surface. The first pad region may have an inner surface without ridges, or a substantially smooth inner surface.

The first and second ridges may be defined by a pattern such as a non-linear pattern. The first and second ridges may be of the same pattern or of differing patterns. The first and second ridges provide for additional flexibility and traction of the second skin paw protector.

The first pad region may further comprise a second material. The second material may have at least one of a grit material (i.e., sand, silicon carbide, or aluminum oxide), a glow in the dark material, or a thermos-responsive material.

A circumference of the protrusion (or, toe garage) may be smaller than a circumference of the paw engaging portion. A thickness of the protrusion may be greater than a thickness of the paw engaging portion. A thickness of the paw engaging portion may gradually increase from the first pad region to the protrusion.

The second skin paw protector may comprise a collar disposed at the proximal end of the body. The second skin paw protector may comprise a lip extending from the collar along the limb engaging portion.

The second skin paw protector may comprise a pair of slots disposed on the lip. Each slot may be configured to receive a wrapping member. The second skin paw protector may further comprise a wrapping member coupled to the body at the limb engaging portion. The wrapping member can be configured to wrap around the dog limb. The wrapping member may be disposed through the pair of slots and configured to wrap around the body.

The second skin paw protector may further comprise a ribbed region disposed on an interior surface of the limb engaging portion. The ribbed region may comprise at least one internal rib. Each internal rib may comprise a slanted face and a perpendicular face. Each slanted face may be disposed closer to the proximal end than the perpendicular face. Each slanted face may be longer than each corresponding perpendicular face. The at least one internal rib may be a plurality of internal rib.

The second skin par protector may comprise an inner surface of the first pad region. The inner surface of the first pad region may be substantially smooth.

In another aspect, the subject matter may be embodied in an applicator for a second skin paw protector. The applicator may comprise an annulus, a concave wall, a curved top edge, and a curved bottom edge.

The concave wall may be cylindrical. The concave wall may comprise a proximal terminus having a first inner diameter. The concave wall may comprise a distal terminus having a second inner diameter. The concave wall may comprise a midsection located axially between the proximal terminus and the distal terminus. The midsection may have a third inner diameter.

The first inner diameter may be equivalent to the second inner diameter. The third inner diameter may be less than the first inner diameter.

In another aspect, the subject matter may be embodied in a method of using a second skin paw protector configured to be worn by a dog. The method can include inserting a paw of the dog into an open end of a body formed from a first material having a top, a bottom, a limb engaging portion, and a paw engaging portion. The method can further include securely engaging the limb engaging portion to a limb of the dog. The method can further include securely engaging the paw engaging portion to the paw of the dog. The method can further include receiving one or more dog nails into a plurality of openings disposed in the paw engaging portion.

In another aspect, the subject matter may be embodied in a method of using a second skin paw protector. The method may include inserting a paw of the dog into an open end of a body formed from a first material and having a proximal end, a distal end, a limb engaging portion, and a paw engaging portion. The method can further include securely engaging the limb engaging portion to a limb of the dog. The method can further include securely engaging the paw engaging portion to the paw of the dog. The method can further include receiving one or more dog nails into a protrusion disposed in the paw engaging portion. The method may further include, prior to inserting the paw of the dog into the open end, securing a stretched portion of the second skin paw protector around an applicator such that the paw engaging portion is accessible. The method may further include inserting the paw of the dog into the paw engaging portion using the applicator.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 4A, FIG. 4B, FIG. 4C, FIG. 4D, FIG. 4E, and FIG. 4F are bottom, bottom perspective, top perspective, top, side, and front views, respectively, of a second skin paw protector which is configured to be worn by a dog, in accordance with various embodiments;

DETAILED DESCRIPTION

Figure 1B:
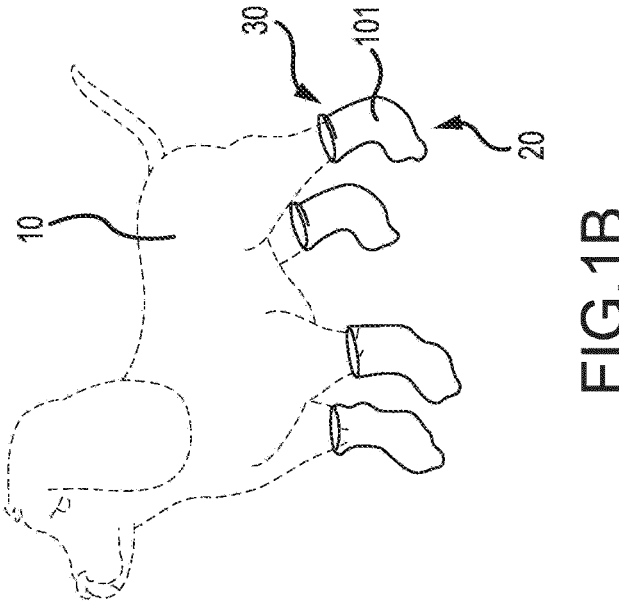
FIG. 1B illustrates a dog wearing second skin paw protectors, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials. In some cases, reference coordinates may be specific to each figure.

A second skin paw protector of the present disclosure, in various embodiments, is designed to cling securely to a dog (e.g., to one or more of a paw, ankle, and/or leg), while allowing the dog's paw and leg to move naturally with little resistance. For example, the second skin paw protector of the present disclosure may be made of a stretchable fabric, of a stretchable polymer, or of a stretchable copolymer that is designed to be resiliently deformable, such that it will expand to accommodate a dog's paw and will contract against the surface of the dog's skin and/or coat (i.e., fur coat or hair coat) to position the second skin paw protector securely on the dog's paw. As a result, the second skin paw protector of the present disclosure functions in a similar manner as the dog's skin and/or coat as the wearer walks and/or runs, while simultaneously providing an additional layer of protection to the wearer's foot.

Although described herein in connection with a dog, it should be understood that a second skin paw protector of the present disclosure can be used in connection with various animals, including cats, without departing from the scope of the present disclosure.

A second skin paw protector of the present disclosure may be made of easy care materials, much like a swimsuit, which are both durable and long lasting. In various embodiments, the second skin paw protector is made from a blend of durable, expandable fabrics such as one or more of nylon, polyester, polyurethane, and spandex, such as Lycra® brand fiber. "Lycra" is a registered trademark of Invista North America S.a.r.L., of Wilmington, Del. In various embodiments, the second skin paw protector is made from a flexible, chemical resistant or chemical proof, waterproof, heat resistant, thermally stable, washable, biodegradable, and/or recyclable material. In various embodiments, the second skin paw protector is made from Styrene-Ethylene-Butylene-Styrene (SEBS). In various embodiments, silver coated (e.g., nano particulate silver) nylon fibers, charcoal, and/or bamboo fibers may be added to provide an antimicrobial barrier that deters fungus, bacteria and odor. In various embodiments, the second skin paw protector may comprise a glow in the dark or reflective material. In various embodiments, the second skin paw protector may comprise a thermo-responsive or mood material.

By forming the second skin paw protector of the present disclosure from a resiliently deformable material, in various embodiments, the second skin paw protector of the present disclosure can be easily slipped on and off the wearer's foot and does not have to be removed for the wearer to actively engage in a activities, such as walking, running, hiking, and swimming, for example. In addition to providing footwear that allows the wearer to actively engage in land and water related activities without the fear that the footwear may become dislodged from the wearer's foot, the second skin paw protector of the present disclosure also provides a non-slip sole that allows the wearer to seamlessly pass from wet to dry surfaces. In various embodiments, the non-slip sole of the second skin paw protector of the present disclosure is comprised of a soft, flexible polymer material applied on pressure points like the metacarpal pad, the metatarsal pad, and the digital pads of the paw. This protects the bottom of the dog's paw from damage or injury caused from contact with an exposed surface. Additionally, the non-slip sole (e.g., a sole comprised of silicone) of the second skin paw protector also tends to lessen the rate of wear of the bottom of the second skin paw protector, which extends the useful life of the second skin paw protector. Non-slip silicone may be used for protection against intense heat and rough surfaces.

In various embodiments, a second skin paw protector made of a resiliently stretchable fabric material of the present disclosure can be configured to conform the shape of the second skin paw protector to the shape of dog's paw, thereby increase stabilization of the dog paw within the second skin paw protector. Due to the increased stability of the dog paw in the second skin paw protector, relative movement between second skin paw protector and the dog paw may be prevented or decreased while the second skin paw protector is in use. In various embodiments, decreased or prevented relative movement between the second skin paw protector and the dog paw may improve comfort of the second skin paw protectors for the dog, improve wicking of moisture through second skin paw protectors and away from the dog paw, and/or prevent or decrease the risk that the dog's paw will develop blisters or sores during use.

A second skin paw protector of the present disclosure, in various embodiments, can include a plurality of openings disposed at a toe end thereof that are dimensioned to accommodate nails or claws of the dog's paws, as described herein, as well, as in various embodiments, the digital pads of the dog paw. In this manner, a second skin paw protector of the present disclosure can be more comfortable for a dog and can allow for the dog's nails to be naturally manipulated when the dog is at rest, bearing weight on its feet, and/or moving. This tends to enhance dog tolerance of the second skin paw protector and tends to enhance the comfort of the dog.

A second skin paw protector of the present disclosure, in various embodiments, has a toe end without openings, or a sealed toe end. In various embodiments, a toe end without openings may include a toe box and a toe garage (also referred to herein as a protrusion). The toe box may be the portion of the second skin paw protector configured to stretch around, contain, and/or conform to the dog's paw and toes. The protrusion may extend from at least a portion of the toe box to provide extra space for the dog's nails without compressing the dog's nails. In this manner, a second skin paw protector of the present disclosure can be comfortable for a dog and can allow for the dog's nails to be naturally manipulated when the dog is at rest, bearing weight on its feet, and/or moving. This tends to enhance dog tolerance of the second skin paw protector and tends to enhance the comfort of the dog.

Figure 1A:
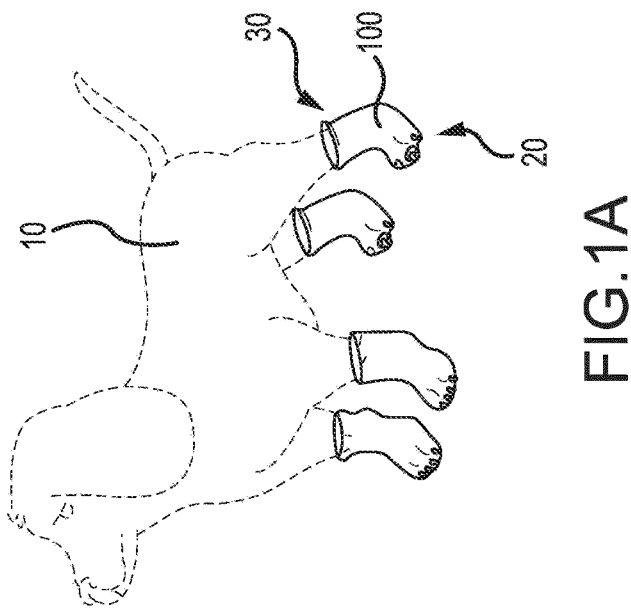
FIG. 1A illustrates a dog wearing second skin paw protectors, in accordance with various embodiments.

In various embodiments, and with reference to FIG. 1A, pet footwear 100, also referred to herein as second skin paw protectors, that is configured to be worn by an animal 10, such as a dog, is provided. The second skin paw protectors 100 may be configured to cover and protect a foot or paw 20 of the dog 10 such that it may securely surround a portion of the paw 20 of the dog 10. The second skin paw protectors 100 may be configured to cover and protect a lower portion of a leg 30 of the dog 10 such that it may securely surround said portion of the leg 30 of the dog 10. The second skin paw protectors 100 may be secured about the paw 20 of the dog 10 by placing the paw 20 through an upper open end of the second skin paw protector 100 (e.g., similar to putting on a sock over a human foot). The second skin paw protector 100 can be pulled over the paw 20 and partially over the ankle and/or leg 30 of the dog 10. The second skin paw protector 100 can stretch in response to being placed over the paw 20 and can subsequently contract to securely engage the paw 20 and/or leg 30 of the dog 10. The second skin paw protectors 100 may be configured to contour to the paw 20 and/or leg 30 of the dog 10. The second skin paw protectors 100 may be configured to ergonomically interact with the paw 20 and leg 30 (e.g., including the ankle) when the dog 10 is at rest, bearing weight on the paw 20, and/or moving. The second skin paw protectors 100 may be configured to be lightweight, breathable, and/or stretchable to accommodate use in a variety of environments and/or by a variety of animals.

The second skin paw protectors 100 can include openings at a toe end thereof that are dimensioned to accommodate nails or claws of the dog's paws, as described herein.

The second skin paw protectors 100 may be formed by any or any combination of knitting, stitching, weaving, or sewing. In various embodiments, the second skin paw protector 100 is woven or knitted from a blend of materials, either natural or synthetic. For example, the second skin paw protector 100 may be formed from a combination of cotton, a polychloroprene, such as polychloroprene, nylon or polyester, i.e., polyethylene terephthalate or PET, for durability, and a polyester and polyurethane blend, such as spandex, such as Lycra® brand fiber, for expandability. In various embodiments, the second skin paw protector 100 may be at least partially formed of polymerized chloroprene (polychloroprene) such as that sold under the NEOPRENE mark of Dupont Performance Elastomers of Wilmington, Del. In various embodiments, the second skin paw protector 100 is formed from as little as 65 percent, 70 percent, or 80 percent and as much as 85 percent or 90 percent of at least one of cotton, polychloroprene, nylon, or polyester. In various embodiments, the second skin paw protector 100 is formed from as little as 10 percent, 15 percent, or 20 percent and as much as 25 percent, 30 percent, or 35 percent spandex fibers. Possible fabrics may include silicone, performance knit fabrics, Spandex blends (as described above), polyester and elastine, recycled polyester and lycra (as described above).

With reference to FIG. 1B, a second skin paw protector 101 is provided. The second skin paw protectors 101 may be similar to second skin paw protector 100. However, second skin paw protectors 101 do not have openings at the toe end thereof. Paw protectors 101 have a sealed toe end. In various embodiments, the sealed toe end may include a toe box and a protrusion.

With reference to FIG. 2A through FIG. 2F, a second skin paw protector 200 is illustrated, in accordance with various embodiments. In various embodiments, second skin paw protector 100 of FIG. 1A can be similar to second skin paw protector 200. The second skin paw protector 200 can be formed as a substantially tubular, elongate body 202. The body 202 can be formed from a resiliently stretchable fabric material as described herein. The body 202 can include a top 204, a bottom 206, a limb engaging portion 208, and a paw engaging portion 210. In various embodiments, the limb engaging portion 208 can be oriented at a non-parallel angle with respect to the paw engaging portion 210. In this manner, the body 202 can be shaped to accommodate the natural curve of a dog's leg and foot.

In various embodiments, the interior surface 234 of second skin paw protector 200 is configured to be in contact with the paw 20 of the dog 10. In various embodiments, the bottom side 206 of the second skin paw protector 200 is configured to be in contact with the ground when the second skin paw protector 200 is in use (e.g., when the dog 10 is standing or walking with the second skin paw protectors 200 secured on paw 20). The second skin paw protector 200 can include a first end 212 configured to be disposed at or near the leg 30 of the dog 10 when the second skin paw protector 200 is in use. The second skin paw protector 200 can include a second end 214 opposite the first end 212 and configured to be disposed at or near the toes and/or claws/nails at the forward end of the dog paw 20 when the second skin paw protector 200 is in use.

The limb engaging portion 208 can terminate at the first end 212 (also referred to as an upper end) that is open. Stated differently, the limb engaging portion 208 can terminate at an open end 212. The paw engaging portion 210 can terminate at the second end 214 (also referred to as a lower end or a toe end). The second end 214 can include a plurality of openings (e.g., opening 216a, opening 216b, and opening 216c; referred to generally as openings 216) dimensioned and located to accommodate one or more nails of a dog. In various embodiments, the plurality of openings 216 includes a center opening 216b disposed between a first side opening 216a and a second side opening 216c. Dogs typically have four nails extending forward from their paws. The center opening 216b can be configured to accommodate the two center dog nails and each side opening 216a, 216c can be configured to accommodate an associated side dog nail. In various embodiments, the openings 216 can be tailored (i.e., sized and positioned) according to the species of dog expected to wear the second skin paw protector 200. Moreover, although illustrated as having three openings 216, a second skin paw protector of the present disclosure can have any number of openings that are configured to receive one or more dog nails without departing from the scope of the present disclosure. In that regard, the plurality of openings 216 is configured to allow at least a portion of a dog's nails to protrude through each opening in the plurality of openings 216 and, in various embodiments, plurality of openings 216 is configured so that a dog's nails protrude completely through the plurality of openings 216. Though a dog's digital pads may at least partially protrude from plurality of openings 216 in various embodiments, in further embodiments, a dog's digital pads do not protrude through plurality of openings 216, even though plurality of openings 216 allows a dog's nails to completely protrude through plurality of openings 216. Having a dog's nails completely protrude through plurality of openings 216 allows for enhanced comfort for the dog.

Figure 2A:
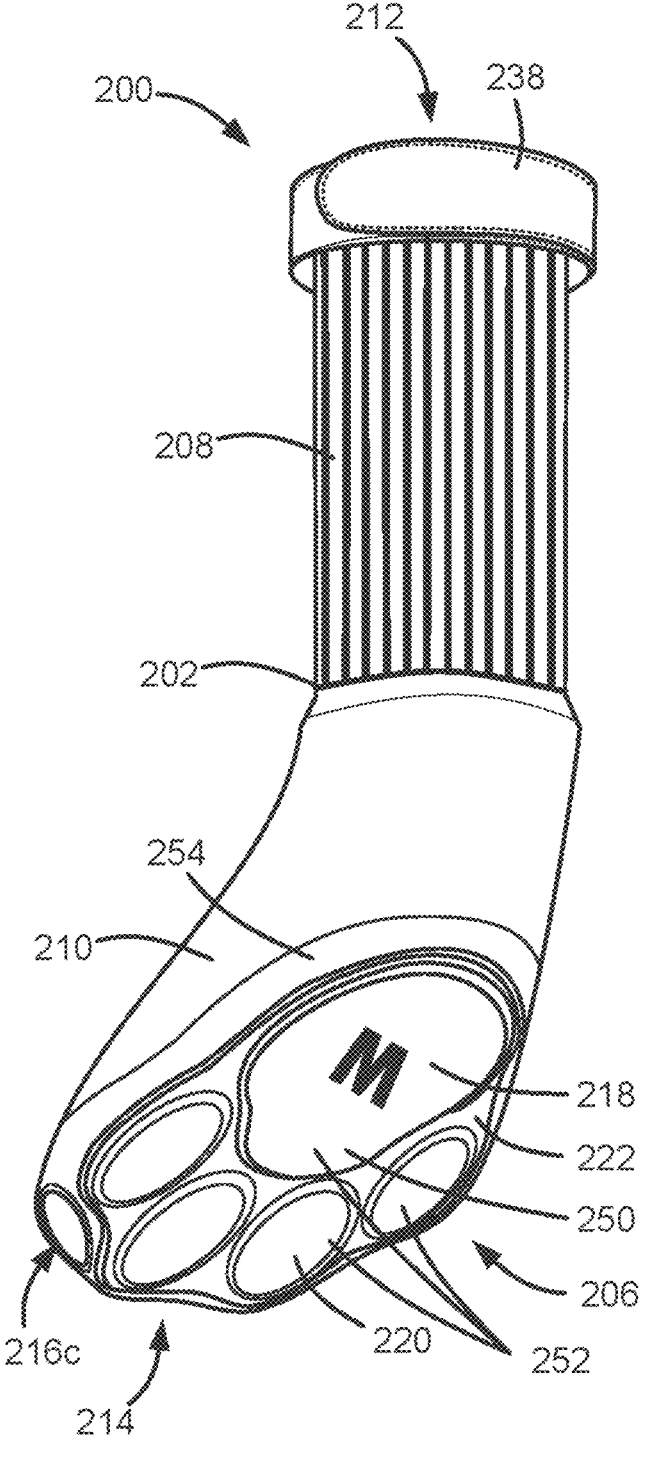
FIG. 2A, FIG. 2B, FIG. 2C, FIG. 2D, FIG. 2E, and FIG. 2F are bottom perspective, top perspective, top, side, bottom, and front views, respectively, of a second skin paw protector which is configured to be worn by a dog, in accordance with various embodiments.
Figure 2B:
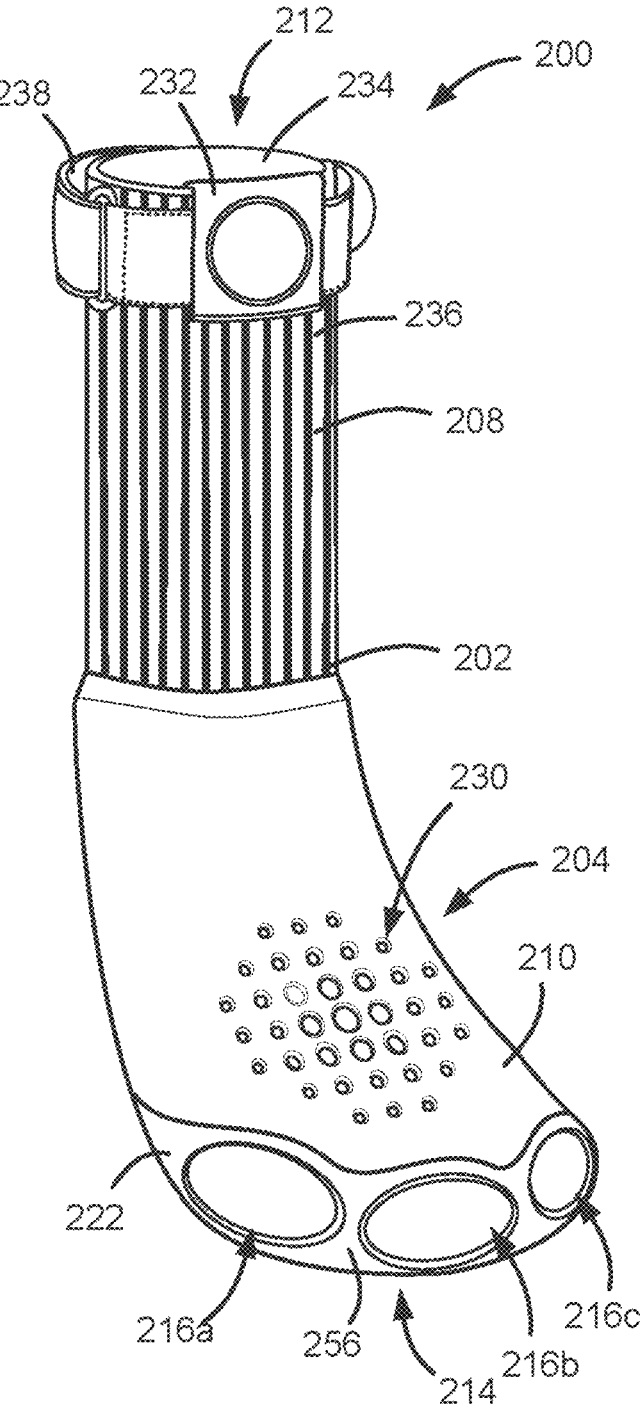
Figures 2C, 2D:
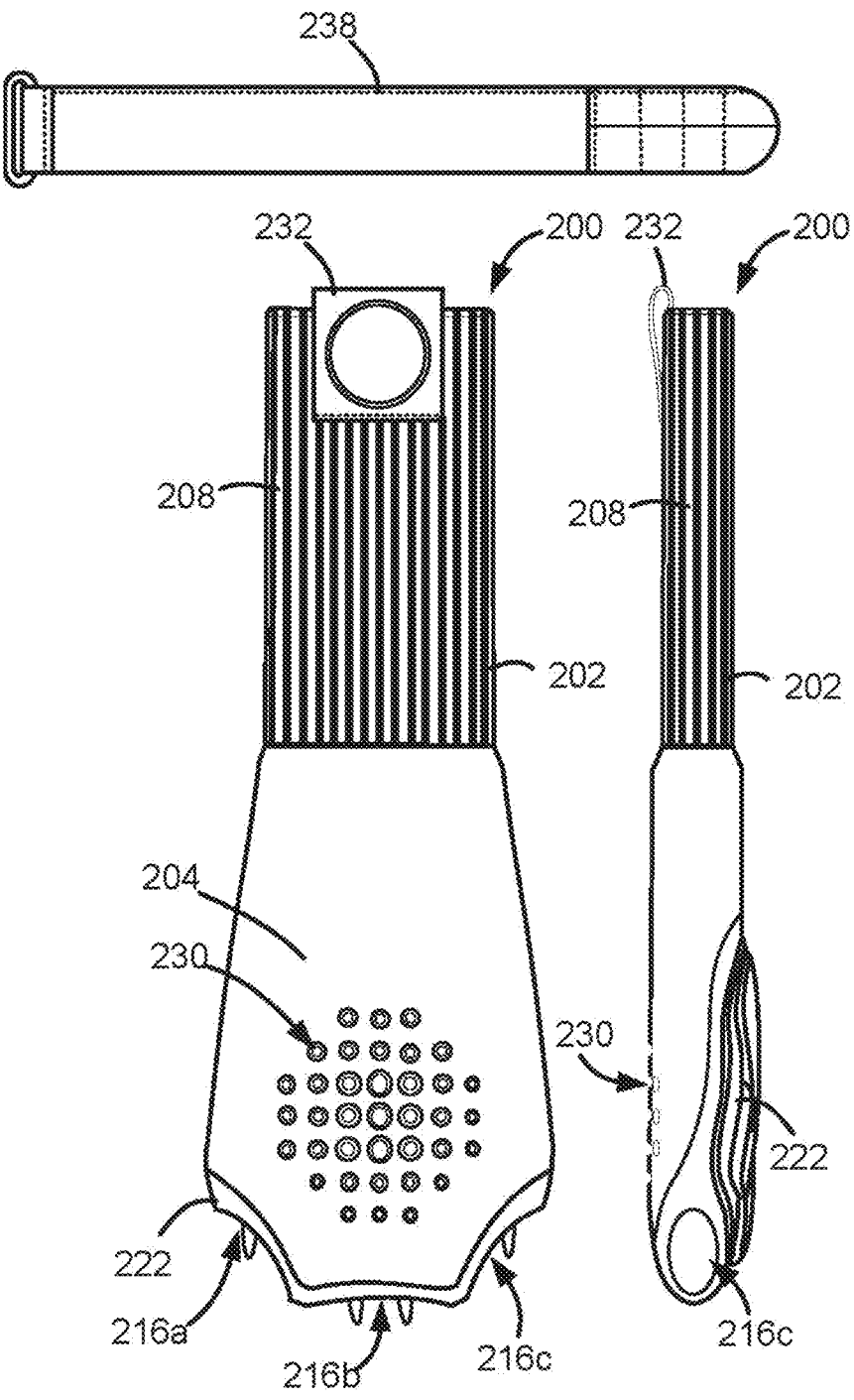
Figures 2E, 2F, 3:
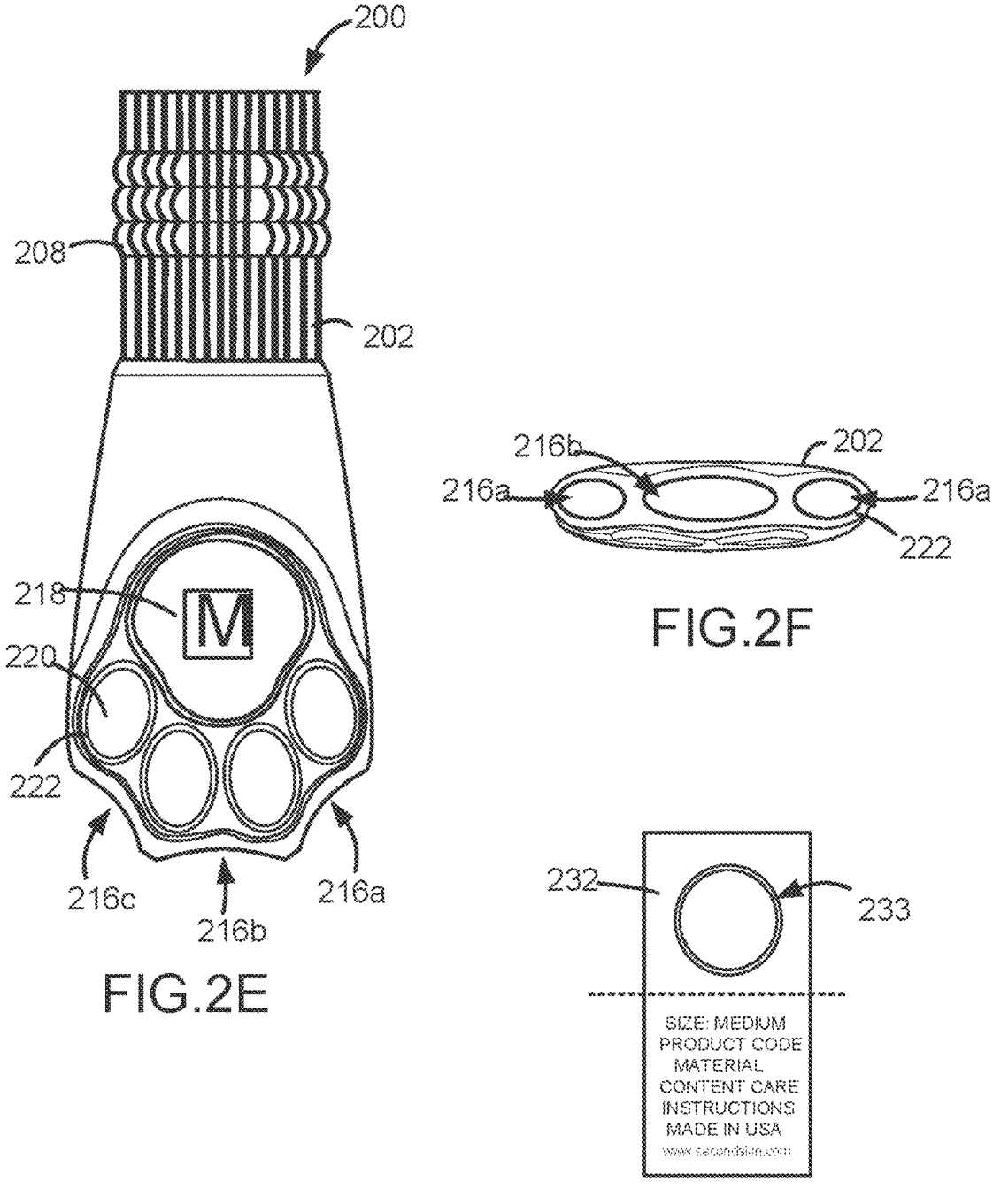
FIG. 3 illustrates a loop for a second skin paw protector before being folded and attached to the second skin paw protector, in accordance with various embodiments.
Figures 4C, 4D, 4E, 4F:
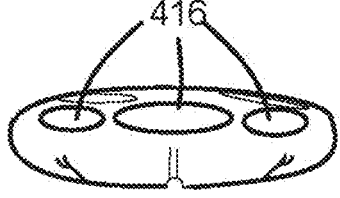

With particular focus on FIG. 2A and FIG. 2E, the bottom 206 can have a metacarpal/metatarsal pad region 218 and a digital pad region 220. The metacarpal/metatarsal pad region 218 can be sized and located to support the dog's metacarpal pad (when used with the dog's forelimb) or the dog's metatarsal pads (when used with the dog's hindlimb). The digital pad region 220 can be sized and located to support the dog's digital pads.

In various embodiments, regions 218, 220 of the second skin paw protector 200 are formed as slip resistant regions on the bottom 206 of the second skin paw protector 200. In various embodiments, regions 218, 220 of the second skin paw protector 200 are formed as wear resistant regions on the bottom 206 of the second skin paw protector 200. In various embodiments, each of regions 218, 220 have an articulated structure and a thickness that does not exceed ³⁄₁₆ of an inch. This allows the regions 218, 220 to have high flexibility and high stretchability. In various embodiments, a polymer material layer 222, such as a silicone or the like, is bonded to the bottom 206 of the body 202 at the regions 218, 220. For example, in various embodiments, the polymer material layer 222 is heated and/or melted and positioned on the regions 218, 220, such that the polymer material layer 222 interdigitates with the material forming the second skin paw protector 200. Then, once the polymer material layer 222 cools, the polymer material layer 222 is securely bonded to the material forming the bottom 206 of the second skin paw protector 200 adjacent to the regions 218, 220. For example, the polymer material layer 222 can be formed using a dipping process where the fabric material located at the bottom 206 of the body 202 is dipped into a pool of melted polymer material. In further embodiments, the polymer material layer 222 may be formed as a sheet that is stamped or otherwise processed to have a desired shape, such as the shape of each of the regions 218, 220. Then, the polymer material layer 222 may be secured to the material forming the bottom 206 of the second skin paw protector 200 in any known manner, such as by ultrasonic welding. Any combination of the aforementioned processes can be used to bond the polymer material layer 222 to the fabric material of the body 202. Polymer material layer 222 may comprise at least one of silicone, rubber, synthetic rubber, or other polymeric material.

In various embodiments, and with particular focus on FIG. 2A, the polymer material layer 222 at the bottom side 206 of second skin paw protector 200 may act as a sole 250. The sole 250 may comprise a material configured to withstand the wear or walking or running on rugged surfaces. Accordingly, the polymer material layer 222 of the second skin paw protector 200 can lessen the rate of wear of the bottom of the second skin paw protector 200, which extends the useful life of the second skin paw protector 200. The sole 250 may be configured to be heat resistant and/or otherwise insulate the paw 20 from hot and/or cold ground surface temperatures. In various embodiments, the sole 250 is heat resistant up to about 400° C. The polymer material layer 222 can be located at pressure points like the metacarpal/metatarsal pad region 218 and the digital pad region 220. This protects the bottom of the dog's paw from damage or injury caused from contact with an exposed surface. In various embodiments, the polymer material layer 222 forms one or more slip resistant pads 252 positioned on the bottom 206 of the body 202.

In various embodiments, the polymer material layer 222 may form a side bumper 254 disposed at or near at least a portion of the outer perimeter of the sole 250. The side bumper 254 may extend upwardly from a top surface of sole 250 so as to create a sidewall around at least a portion of sole 250. The side bumper 254 may have a uniform height or may vary in height around the outer perimeter of sole 250.

In various embodiments, the polymer material layer 222 wraps around the toe end 214 of the second skin paw protector 200. For example, the openings 216 are located at the toe end 214. The polymer material layer 222 can surround each of the openings 216, which can increase the durability, and lessen the rate of wear, of the toe end 214. For example, the dog's nails can extend at least partially through the openings 216 and the polymer material layer 222 can protect the fabric material of the body 202 from the dog's nails, thereby preventing rips, tears, and other wear of the fabric material of the body 202.

In various embodiments, polymer material layer 222 is configured to provide support and security to the paw 20 of the dog 10 while in use. The polymer material layer 222 can also act as a toe bumper 256 to protect the toes on the paw 20 of the dog 10 while second skin paw protector 200 is in use. The toe bumper 256 may extend upwardly from a top surface of sole 250 so as to create a sidewall around at least a portion of sole 250. For example, while in use over rocky terrain, the polymer material layer 222 may provide cushioning, impact resistance, or other protection if the dog 10 hits its paw 20 or stubs its toe on an object.

In various embodiments, the polymer material layer 222 has an enhanced slip resistance that is achieved by adding a grit material to the polymer. In exemplary embodiments, the grit material is one of or a combination of sand, silicon carbide, and aluminum oxide. The grit material may have various levels of particle uniformity and particle average diameter. By adding a grit material to the polymer, the surface area of the regions 218, 220 is increased and the friction generated between a contacting surface, such as the ground, and the regions 218, 220 is correspondingly increased. As a result, the slip resistance of the regions 218, 220 and the second skin paw protector 200 is increased.

With particular focus on FIG. 2B and FIG. 2C, a plurality of vent holes 230 can be disposed in the top 204 of the body 202. The vent holes 230 can be located at the paw engaging portion 210 of the body 202. In various embodiments, each vent hole 230 can be smaller, in total area, than any one of the openings 216. The vent holes 230 may be configured to increase the breathability of the second skin paw protector 200 and to keep the paw 20 of the dog 10 (see FIG. 1A) cool while in use. The vent holes 230 can allow air, fluid, and/or heat circulation around the paw 20 of the dog 10. The vent holes 230 may be configured to increase the breathability of the second skin paw protector 200 and keep the paw 20 of the dog 10 from overheating while in the body 202. In wet conditions or water environments, the vent holes 230 may facilitate fluid drainage from the second skin paw protector 200. Wicking properties of the portions of the second skin paw protector 200 directly abutting the dog's foot, for example, the stretchable fabric material of body 202, may draw fluid away from the dog's paw and toward vent holes 230, through which it may be drained to the exterior of second skin paw protector 200.

In various embodiments, a loop 232 can be sewn or otherwise coupled to the first end 212 of the body 202. The loop 232 can be made of a durable fabric material. With momentary reference to FIG. 3, the loop 232 can be formed as a flat panel configured to be folded about a fold line and sewn or otherwise attached to the body 202. One or more identifying markings 233 (e.g., labels, marketing or branding information, second skin paw protector size information, text, symbols, etc.) can be disposed on the loop 232 so as to provide information to a user about the second skin paw protector 200. In various embodiments, the loop 232 can be folded over the first end 212 of the body 202 such that a first portion of the loop 232 extends over an interior surface 234 of the body 202 and a second portion of the loop 232 extends over an exterior surface 236 of the body 202. In various embodiments, the loop 232 can be made with a reflective material (e.g., a foil metallic material, a reflexive fabric, or the like) to bring awareness of the presence of the dog to the surrounding environment. The loop 232 may be made with a glow in the dark or reflective material.

The loop 232 can be configured to receive a wrapping member, such as a strap 238, configured to wrap around the body 202, for example at the first end 212. The strap 238 may be configured to secure the second skin paw protector 200 on the paw 20 and the leg 30 of the dog 10 (see FIG. 1A). The strap 238 can be configured to wrap around the dog's leg 30 to prevent the first end 212 of the body 202 from sliding down the dog's leg 30. The strap 238 can be configured to wrap around the leg 30 of the dog 10 above the dew claw and/or below the carpal pad. The strap 238 can be configured to wrap around the leg 30 of the dog 10 above the carpal pad. In use, the strap 238 can compress the first end 212 of the body 202 against the dog's leg. The strap 238 can be secured to itself and or the first end 212. The strap 238 can include magnets, snaps, buttons, hook and eye, and/or hook and loop portions configured to couple the strap 238 to itself.

With momentary reference to FIG. 2E, the limb engaging portion 208 can be configured as a "scrunchable" (i.e., can collapse on itself and or compress together to shorten a length thereof) tube portion so that the limb engaging portion 208 can be shortened or elongated as desired to fit a variety of dog leg lengths.

In various embodiments, the limb engaging portion 208 of the body 202 is made of the same material as the paw engaging portion 210 of the body 202. In various embodiments, the limb engaging portion 208 of the body 202 is made of a different material as the paw engaging portion 210 of the body 202. In various embodiments, body 202 is made of one or more lightweight, breathable, stretchable, soft, washable, and/or wicking materials, or any other material suitable for use in second skin paw protector 200.

With reference to FIG. 4A through FIG. 4F, a second skin paw protector 400 is illustrated, in accordance with various embodiments. In various embodiments, second skin paw protector 100 of FIG. 1A can be similar to second skin paw protector 400. The second skin paw protector 400 can be similar to second skin paw protector 200, except that the shape and size of the second skin paw protector 400 can be different from that of the second skin paw protector 200, and the second skin paw protector 400 includes a double loop 432. Accordingly, some features of the second skin paw protector 400 are not repeated for ease of description. Double loop 432 can include a first loop 432a and a second loop 432b. The first loop 432a and the second loop 432b can be formed by sewing a mid-portion of the double loop 432 to the body 402 to divide the double loop 432 into the first loop 432a and the second loop 432b. Accordingly, a user can decide whether to use the upper loop (i.e., first loop 432a), for example for a dog with a longer leg, or the lower loop (i.e., second loop 432b), for example for a dog with a shorter leg.

In various embodiments, the second skin paw protector 400 includes a plurality of openings 416 disposed at a toe end thereof which are dimensioned to receive dog nails at least partially therethrough. The openings 416 can be similar to openings 216 (see FIG. 2B).

Figure 5:
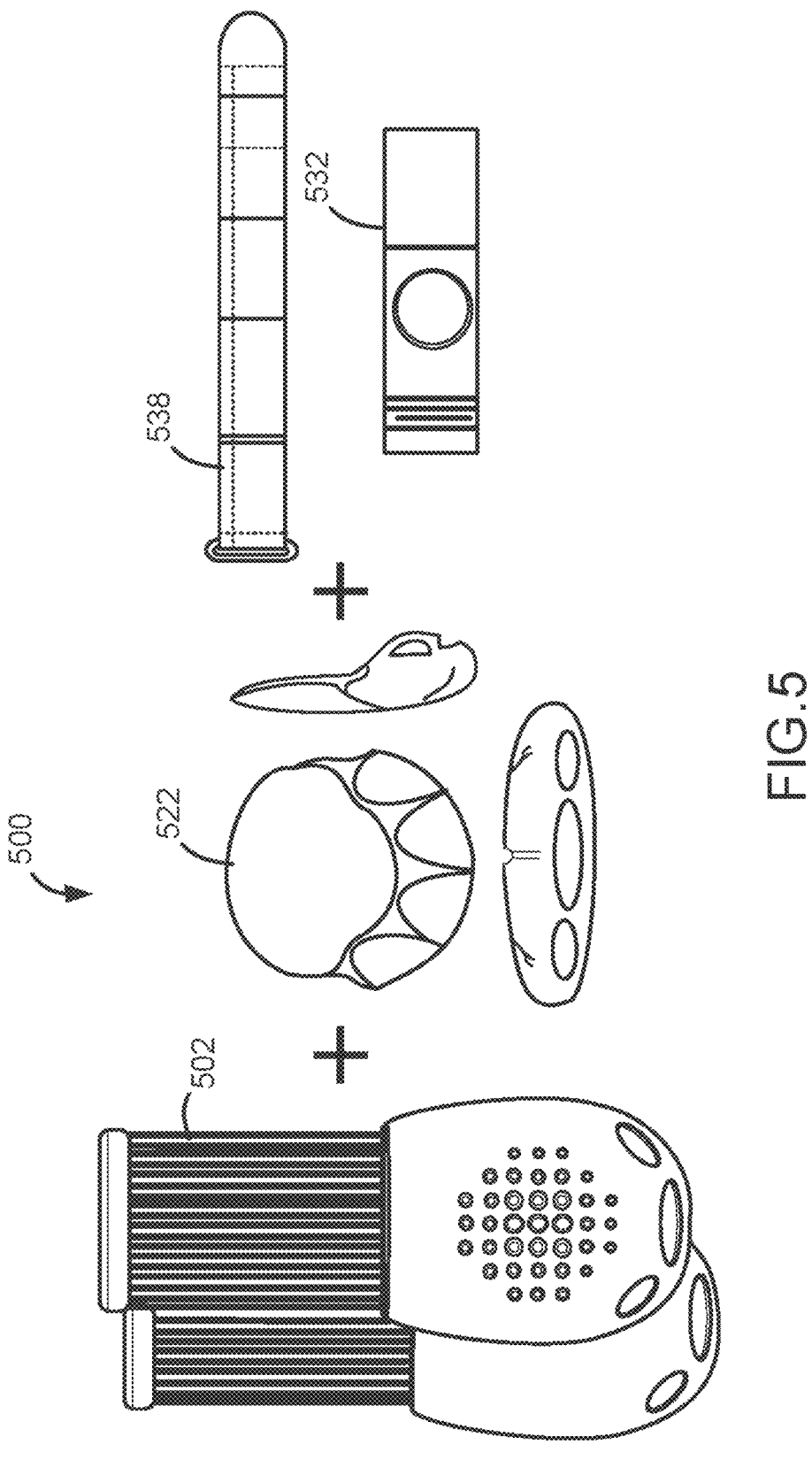
FIG. 5 illustrates an exploded view of second skin paw protector components including a second skin paw protector fabric body, a polymer material layer, a loop, and a strap, in accordance with various embodiments.

With reference to FIG. 5, an assembly view of a second skin paw protector 500 is illustrated, in accordance with various embodiments. The second skin paw protector 500 includes a substantially tubular, elongate body 502 formed from a resiliently stretchable fabric material, a polymer material layer 522 bonded to the bottom of the body 502, a loop 532, and a strap 538 configured to be received through the loop 532. The illustrated components are shown in an exploded view for clarity purposes, though it should be understood that they would normally be coupled together (e.g., bonded or sewn) as depicted in the figures contained herein.

Figure 6A:
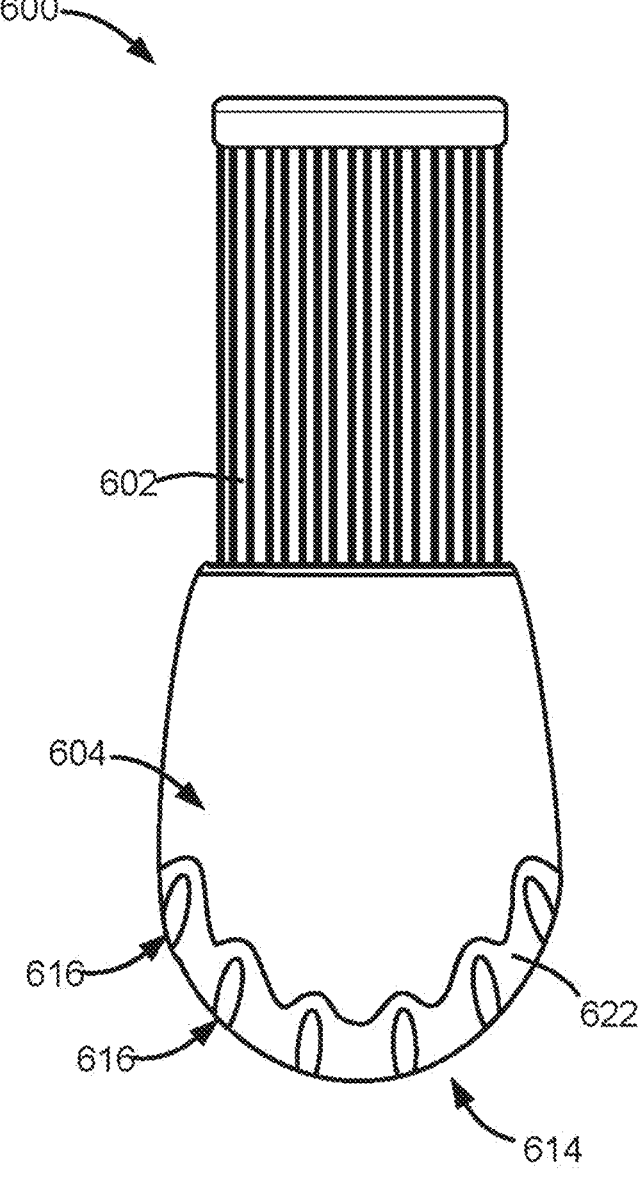
FIG. 6A and FIG. 6B are top and bottom views of a second skin paw protector configured to be worn by an animal, in accordance with various embodiments.
Figure 6B:
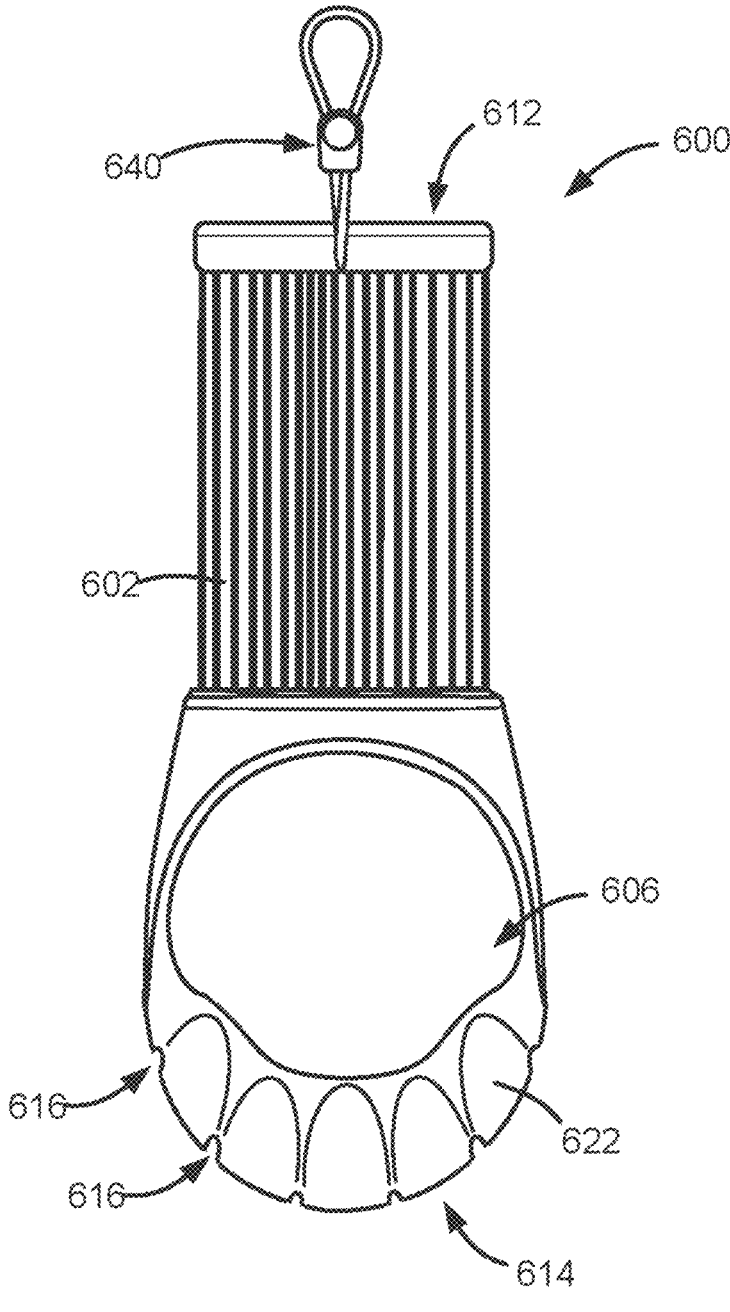

With reference to FIG. 6A and FIG. 6B, top and bottom views, respectively, of a second skin paw protector 600 are illustrated, in accordance with various embodiments. In various embodiments, second skin paw protector 100 of FIG. 1A can be similar to second skin paw protector 600. The second skin paw protector 600 can be similar to second skin paw protector 200, except that the shape of the polymer material layer 622 can be different from that of the second skin paw protector 200, the plurality of openings 616 are smaller than those of the second skin paw protector 200, and the second skin paw protector 600 includes a cinch cord 640.

In various embodiments, each of the openings 616 are dimensioned to receive a single dog nail. For example, the openings 616 can be elongated slots oriented vertically such that the dog nail can move vertically within the opening 616, for example depending on the anatomy of the dog or as the dog's nail moves with respect to the second skin paw protector 600 as the dog applies and releases pressure on the second skin paw protector 600 (e.g., as the dog is walking or running). A width (e.g., measured laterally across the opening; i.e., left to right in the illustrated embodiment) of each opening can be between two to four times the width of a dog nail. For example, the maximum width of each opening 616 can be between 5 mm and 16 mm (0.19 in. and 0.63 in.), depending on the size of dog nail expected to wear the second skin paw protector 600.

In various embodiments, the openings 616 can extend from the top 604 of the body 602 of the second skin paw protector 600 (see FIG. 6A) to the bottom 606 of the body 602 of the second skin paw protector 600 (see FIG. 6B). For example, dog nails tend to curve downward. The dimensions and location of the openings 616 can be configured to comfortably accommodate the dog nails while the second skin paw protector 600 is in use. In various embodiments, there are more openings 616 than there are dog nails. There can be between four and twelve openings 616 in various embodiments, between four and eight openings 616 in various embodiments, and between six and ten openings 616 in various embodiments. The openings 616 can be disposed laterally around the toe end 614 of the body 602 and the dog nails can naturally extend through an opening 616 closest to the dog nail. Stated differently, an excess number of openings 616 can be provided so that dog nails of dog paws having different anatomies can naturally find the closest opening 616. In various embodiments, the openings 616 are equidistantly spaced laterally along the toe end 614 of the body 602. In various embodiments, the openings 616 extend through the polymer material layer 622.

In various embodiments, the second skin paw protector 600 includes a cinch cord 640 that extends around the first end 612 of the body 602. The cinch cord 640 can be sewn around a circumference of the body 620 (e.g., a portion of the cinch cord 640 can extend around a channel sewn into the body 620). The cinch cord 640 can be comfortably tightened to help secure the first end 612 of the body 602 to a dog's leg. In various embodiments, the cinch cord 640 can be omitted and the first end 612 of the body 602 can be securely engaged to a dog's leg in response to the elastic material of the body 602 shrinking and/or compressing around the dog's leg.

Figures 7A, 7B, 7C:
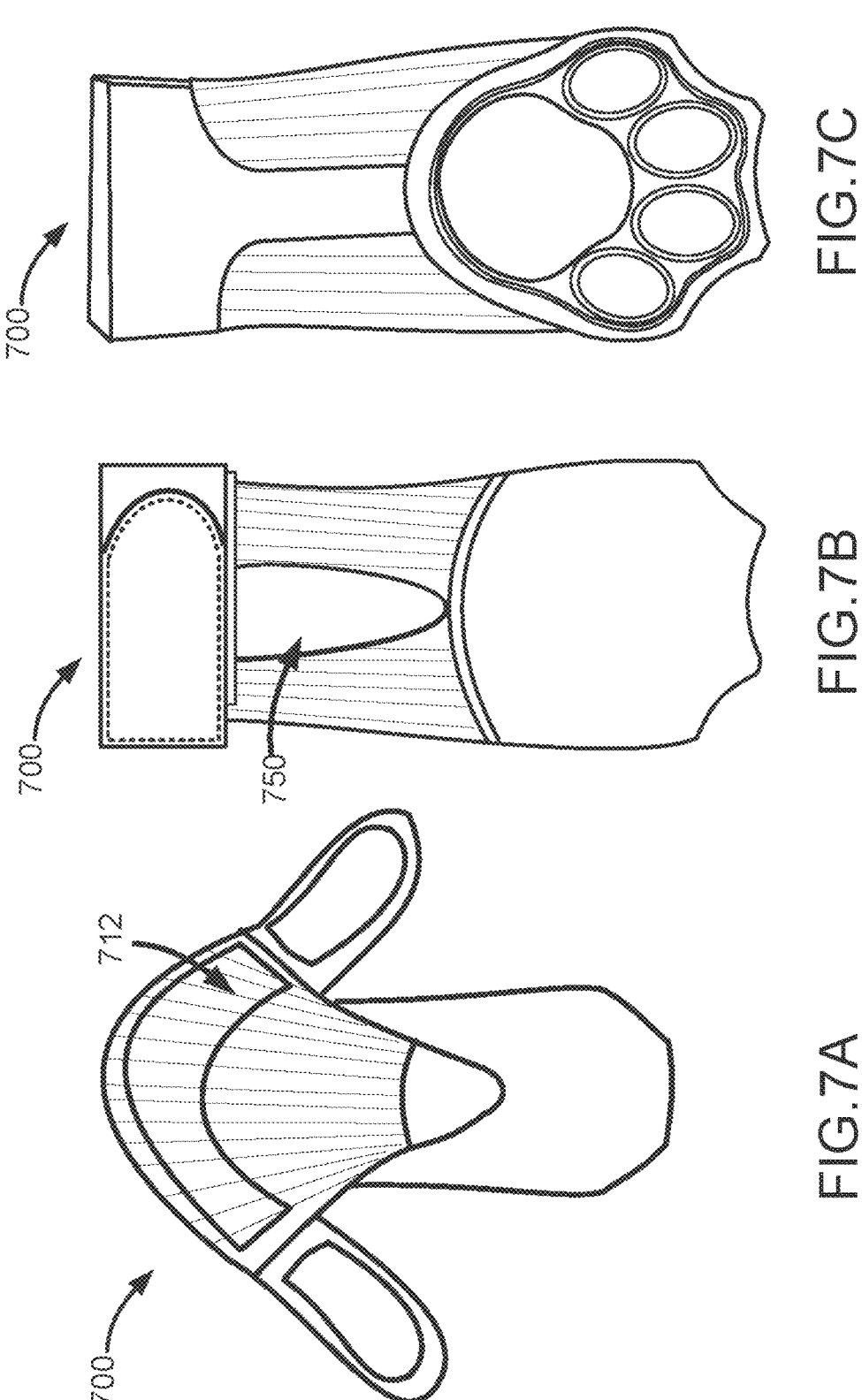
FIG. 7A illustrates a top view of a second skin paw protector with a gusset in an open state, in accordance with various embodiments.
FIG. 7B illustrates a front view of the second skin paw protector of FIG. 7A, with the gusset in a tightened state, in accordance with various embodiments.
FIG. 7C illustrates a bottom view of the second skin paw protector of FIG. 7A, in accordance with various embodiments.

With reference to FIG. 7A, a second skin paw protector 700 is illustrated having a gusset 750 sewn into the body 702 of the second skin paw protector 700 to provide a wider opening at the first end 712 of the body 702 of the second skin paw protector 700 for ease of use. In various embodiments, second skin paw protector 100 of FIG. 1A can be similar to second skin paw protector 700.

With reference to FIG. 8A through FIG. 8F, a second skin paw protector 800 is illustrated, in accordance with various embodiments. In various embodiments, second skin paw protector 101 of FIG. 1B can be similar to second skin paw protector 800. The second skin paw protector 800 can be formed as a substantially tubular, elongate body 802. The body 802 can be formed from a resiliently stretchable fabric or polymer material as described herein. The body 802 can be formed from SEBS. The body 802 can include a front 804, a back 806, a limb engaging portion 808, and a paw engaging portion 810. In various embodiments, the limb engaging portion 808 can be oriented at a non-parallel angle with respect to the paw engaging portion 810. With specific reference to FIG. 8B, the limb engaging portion 808 can be oriented at a non-perpendicular angle with respect to the paw engaging portion 810. In other words, an angle between a center axis A of the limb engaging portion 808 and a center axis B of the paw engaging portion 810 may be an obtuse angle when the second skin paw protector 800 is not in use and not experiencing tensile or compressive forces. In this manner, the body 802 can be shaped to accommodate the natural curve of a dog's leg and foot.

Figures 9A, 9B, 9C:
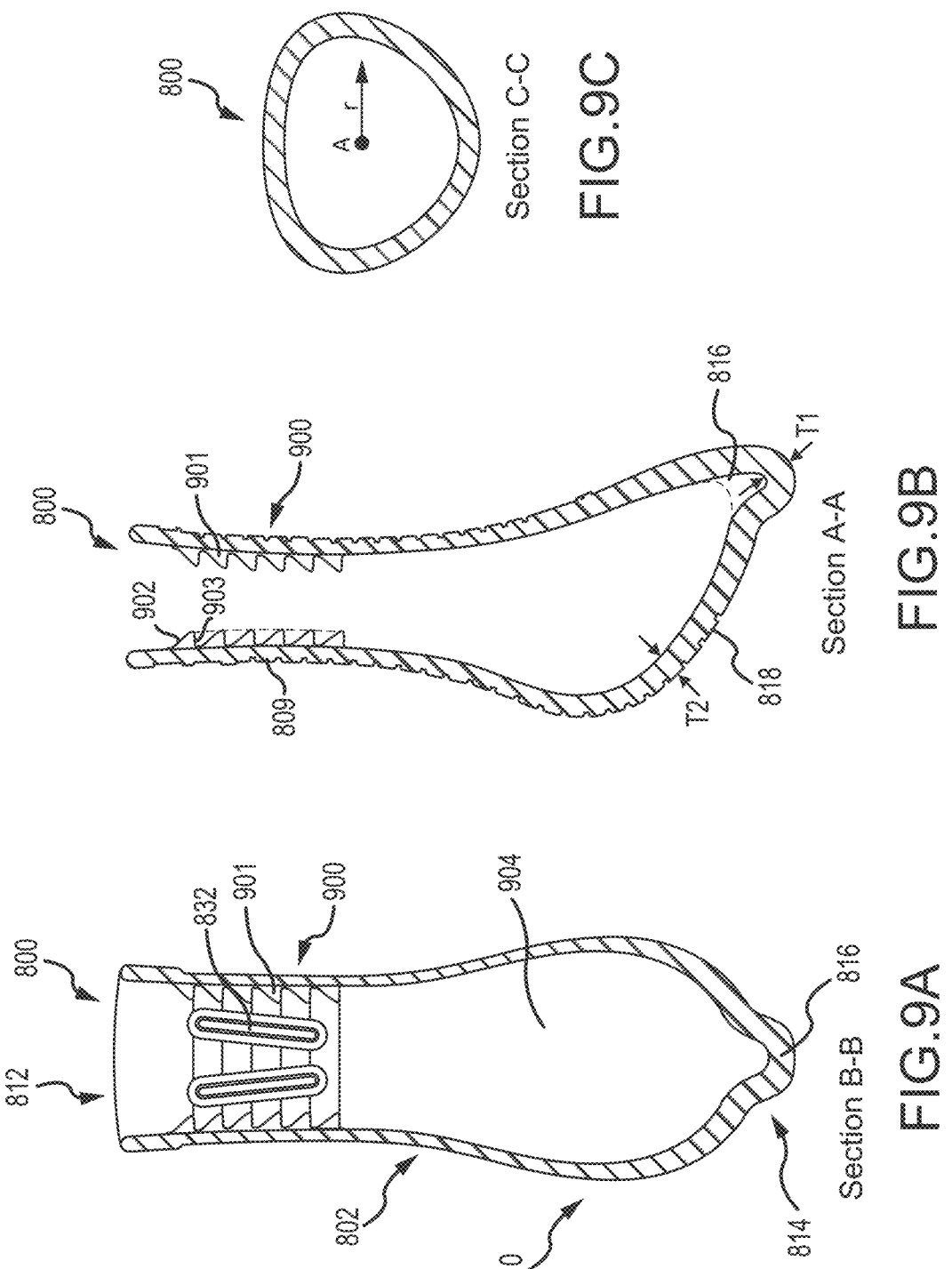
FIG. 9A, FIG. 9B, and FIG. 9C are top, side, and front section views, respectively, of a second skin paw protector which is configured to be worn by a dog, in accordance with various embodiments.

With brief reference to FIGS. 9A and 9B, an average thickness of the paw engaging portion may be greater than an average thickness of the limb engaging portion. A thickness of the body may increase from the limb engaging portion to the paw engaging portion. A thickness of the body may be greatest at the protrusion (also referred to herein as a toe garage).

In various embodiments, the body 802 may be constructed of a first material (e.g., SEBS) monolithically. Thus, the body 802 may be described as being formed from the same material without seams or other joints.

In various embodiments, the interior surface 834 of second skin paw protector 800 is configured to be at least in partial contact with the paw 20 of the dog 10. In various embodiments, at least a portion of the back 806 of the second skin paw protector 800 is configured to be in contact with the ground when the second skin paw protector 800 is in use (e.g., when the dog 10 is standing or walking with the second skin paw protectors 800 secured on paw 20). The second skin paw protector 800 can include a proximal end 812 (also referred to herein as an open end) configured to be disposed at or near the leg 30 of the dog 10 when the second skin paw protector 800 is in use. The proximal end defines an interior volume configured to receive a dog's leg and paw. The second skin paw protector 800 can include a distal end 814 (also referred to herein as a toe end) opposite the proximal end 812 and configured to be disposed at or near the toes and/or claws/nails at the forward end of the dog paw 20 when the second skin paw protector 800 is in use.

The limb engaging portion 808 can terminate at the proximal end 812 (also referred to as an upper end) that is open. Stated differently, the limb engaging portion 808 can terminate at an open end 812. The paw engaging portion 810 can terminate at the distal end 814 (also referred to as a toe end). The distal end 814 may also include a protrusion 816. The protrusion 816 may extend from the paw engaging portion 810. The protrusion 816 may extend from a portion of the paw engaging portion 810. A circumference of the protrusion 816 may be less than a circumference of the paw engaging portion 810. In other words, when the second skin paw protector 800 is in use, the dog paw would reach substantially near an end of the paw engaging portion 810 and not substantially near an end of the protrusion 816. However, a dog's nails or digital pads may reach at least partially into the protrusion 816. In various embodiments, in further embodiments, a dog's digital pads do not protrude into protrusion 816. Because the protrusion 816 is smaller and thicker than the paw engaging portion 810, the paw engaging portion 810 may experience greater tensile forces than the protrusion 816 when in use. In other words, the paw engaging portion 810 may stretch around and conform to the dog paw while the protrusion 816 provides for additional space near or around the dog's nails. In various embodiments, the protrusion 816 can be tailored (i.e., sized and positioned) according to the species of dog expected to wear the second skin paw protector 800. Having extra space near or around the dog's nails allows for enhanced comfort for the dog.

Figure 8B:
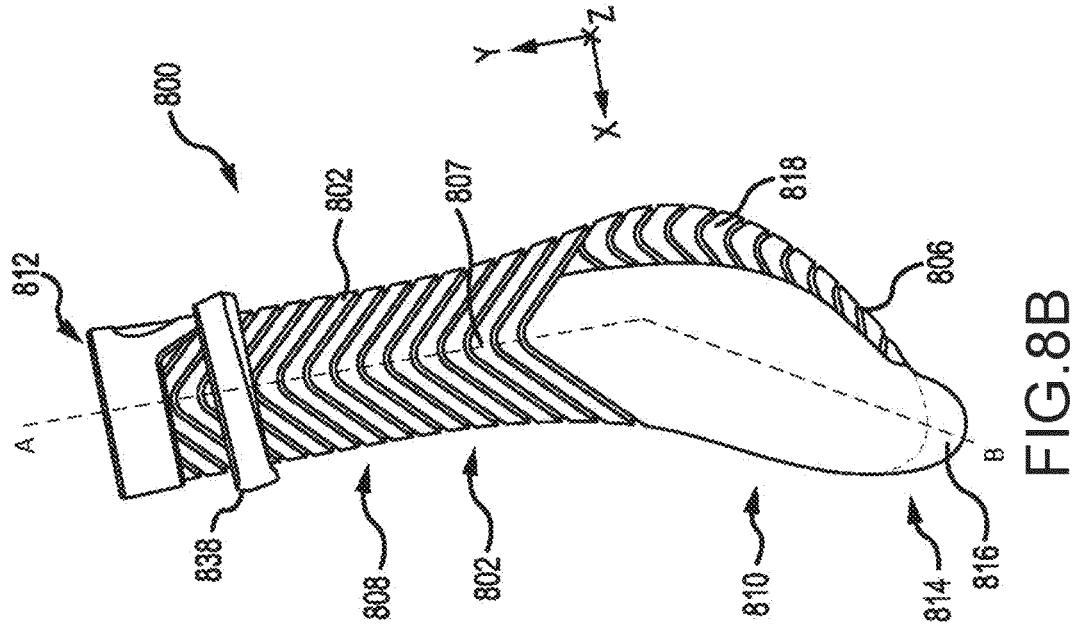
FIG. 8A, FIG. 8B, FIG. 8C, FIG. 8D, and FIG. 8E are top perspective, side perspective, bottom perspective without a pocket, bottom perspective with a pocket, and front perspective views, respectively, of a second skin paw protector which is configured to be worn by a dog, in accordance with various embodiments.
Figure 8A:
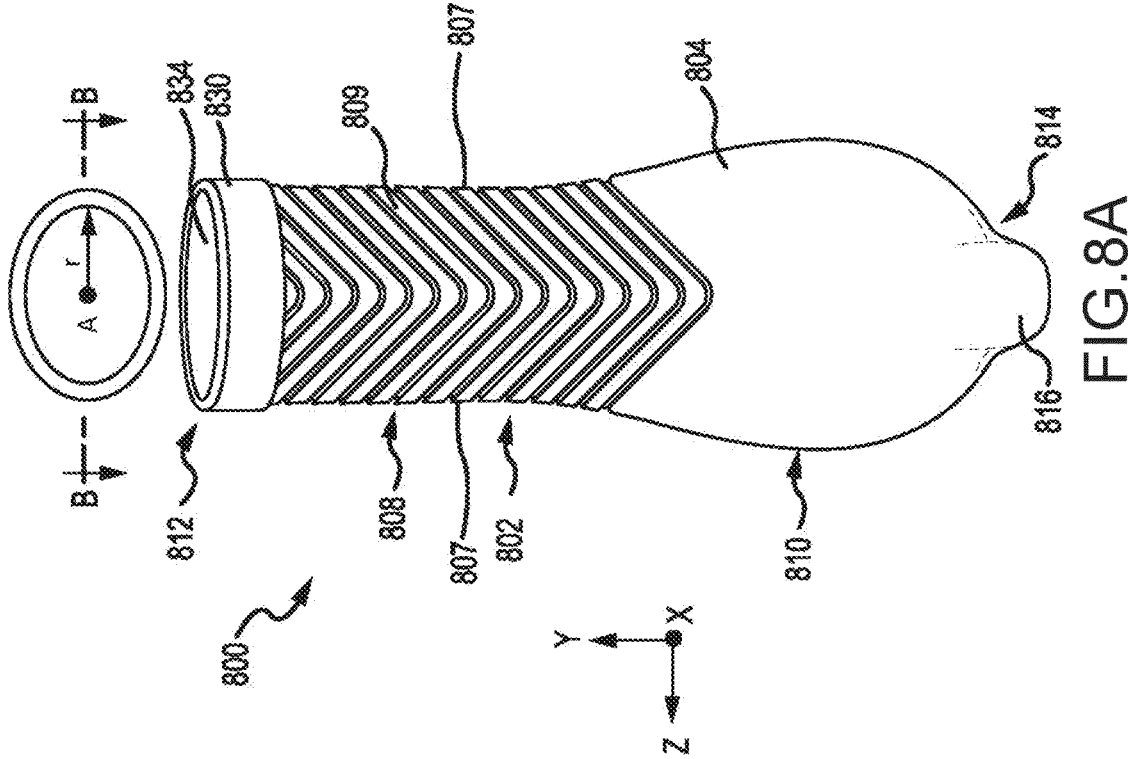

With particular focus on FIGS. 8A and 8B, the body 802 may comprise first ridges 809. In various embodiments, first ridges 809 may be a series of protrusions extending outwardly from body 802. In various embodiments, first ridges 809 may be spaced equally apart. In various embodiments, first ridges 809 may be spaced unequally apart such that a distance between each ridge 809 is greater toward the open end 812 than the distal end 814. In various embodiments, first ridges 809 may be spaced unequally apart such that a distance between each ridge 809 is greater toward the distal end 814 than the open end 812. In various embodiments, first ridges 809 may each be wider than the space between each ridge 809. In various embodiments, first ridges 809 may each be as wide as the space between each ridge 809. In various embodiments, first ridges 809 may each be less wide than the space between each ridge 809. First ridges 809 and the spaces therebetween may provide for greater flexibility of the body 802 as compared to portions of the body 802 without ridges and spaces (for example, second pad region 820). In that regard, first ridges 809 tend to improve dog limb articulation, allowing the body 802 to conform to and move with the dog limb.

In various embodiments, the first ridges 809 may have a thickness of between 0.10 and 0.20 inches. In various embodiments, the first ridges 809 may have a thickness of between 0.10 and 0.15 inches. In various embodiments, the spaces between first ridges 809 may have a thickness of between 0.05 and 0.10 inches. In various embodiments, the spaces 809 between first ridges 809 may have a thickness of between 0.07 and 0.09 inches. In other words, there may be grooves formed between first ridges 809 with a depth of between 0.001 and 0.1 inches. Grooves may have a depth of between 0.01 and 0.04 inches.

In various embodiments, the first ridges 809 may extend circumferentially around body 802. In various embodiments, first ridges 809 may assist with application or removal of the second skin paw protector 800. First ridges 809 may have a "zig-zag" design (i.e., one resembling a three dimensional chevron) with a trough along the front 804 and peaks along each lateral side 807 of the body 802, as depicted. However, it is understood that while first ridges 809 are depicted in a zig-zag design, first ridges 809 may have any design. For example, first ridges 809 may have troughs on the lateral sides 807 of the body 802 and peaks on the front 804. As another example, first ridges 809 may be substantially linear and parallel to the dog's limb 30. As another example, first ridges 809 may be substantially linear and perpendicular to the dog's limb 30. In various embodiments, second skin paw protector 800 is substantially smooth, omitting, first ridges 809.

In various embodiments, first ridges 809 may extend along the limb engaging portion 808. In various embodiments, first ridges 809 may and end at the paw engaging portion 810. In various embodiments, first ridges 809 may and extend at least partially into the paw engaging portion 810.

Figures 8C, 8D, 8E:
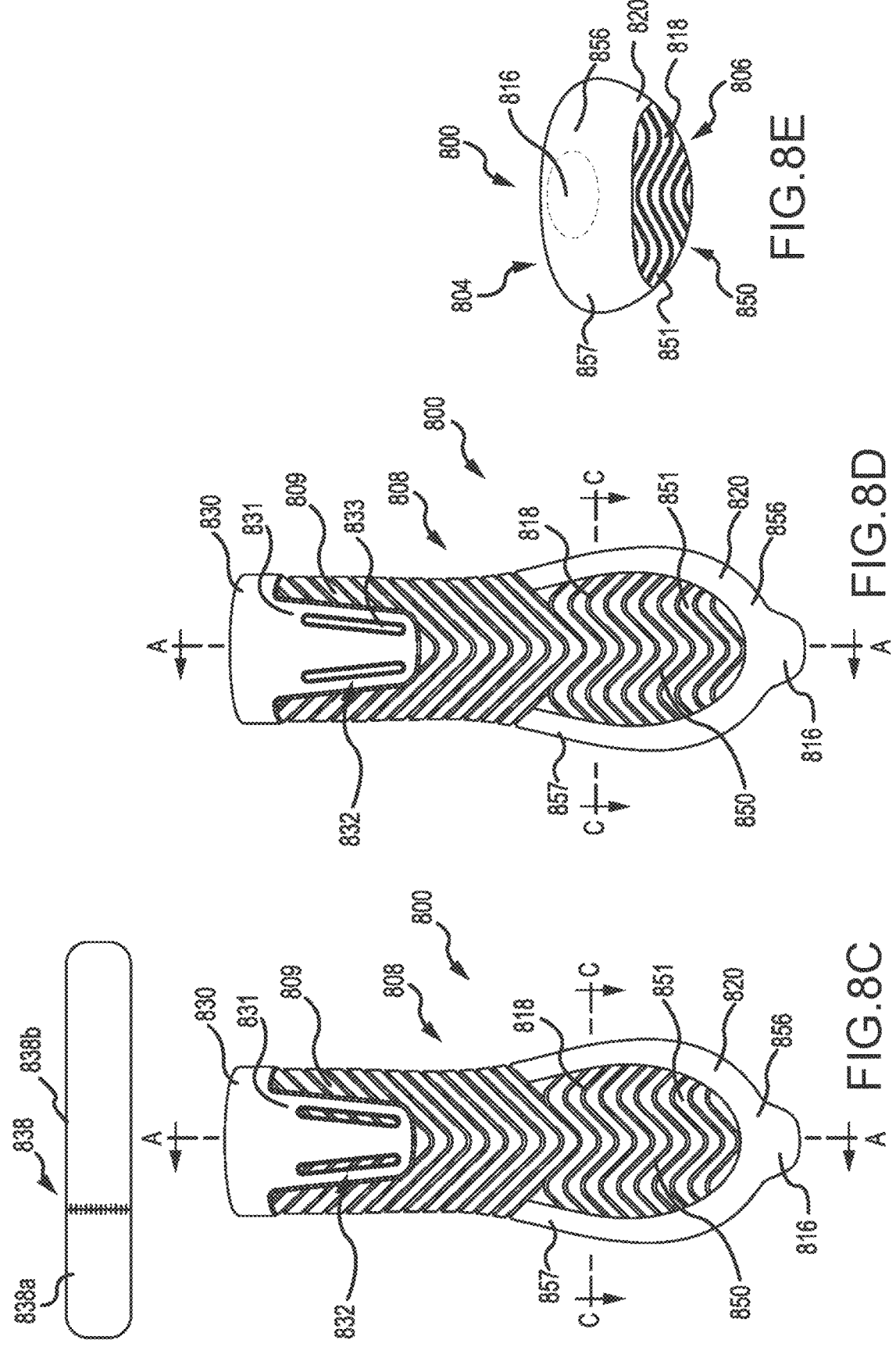

With reference to FIGS. 8A-8C, second skin paw protector 800 may comprise a collar 830 extending circumferentially around body 802 near or disposed on open end 812. Collar 830 may border the open end 812. Collar 830 may assist in securing second skin paw protector 800 to a dog's limb 30. Collar 830 may have an interior surface 834 that is substantially flat, that is, without internal ribs 902 (see FIGS.

9A and 9B). First ridges 809 may end before collar 830. In this manner, collar 830 may prevent buckling of the second skin paw protector 800. Collar 830 may also contain features which identify the size of the second skin paw protector 800 or other custom details of the second skin paw protector 800. In various embodiments, first ridges 809 may extend to and end at collar 830. In various embodiments, first ridges 809 may extend to and end at lip 831.

In various embodiments, collar 830 may have a lip 831. Lip 831 may extend from collar 830 along limb engaging portion 808. In various embodiments, lip 831 may comprise a pair of slots 832. In various embodiments, slots 832 may extend completely through body 802, as depicted in FIG. 8C. In various embodiments, slots 832 extend into a pocket 833 disposed on body 802. In embodiments with the pocket 833, the slots 832 would extend through a first layer of the lip 831 but not through a second layer of the body 802, as depicted in FIG. 8D.

In various embodiments, collar 830, lip 831, and pocket 833 are made from SEBS. Accordingly, the collar 830, lip 831, and pocket 833 may each be constructed monolithically with the body 802. Thus, the body 802, the collar 830, the lip 831, and the pocket 833 may be described as being formed from the same material without seams or other joints. It is understood that the features of the collar 830, the lip 831, and the pocket need not all be included for any individual feature to be included. For example, the body 802 may be formed monolithically with the collar alone 830, or with the collar 830 and lip 831 alone. In various embodiments, while the limb engaging portion 808 and the paw engaging portion 810 are made from SEBS, at least one of (or all of) the collar 830, the lip 831, and the pocket 833 are made from a resiliently stretchable fabric material as described herein. In various embodiments, the at least one of (or all of) the collar 830, the lip 831, and the pocket 833 can be made with a reflective material (e.g., a foil metallic material, a reflexive fabric, or the like) to bring awareness of the presence of the dog to the surrounding environment. At least one of (or all of) the collar 830, the lip 831, and the pocket 833 may be made with a glow in the dark or reflective material.

With particular focus on FIGS. 8B-8E, the back 806 can have a first pad region 818 and a second pad region 820. First pad region 818 may be sized and located to support the dog's metacarpal pad (when used with the dog's forelimb) or the dog's metatarsal pads (when used with the dog's hindlimb). First pad region 818 may be sized and located to at least partially support dog's digital pads. In various embodiments, first pad region 818 may be disposed on the paw engaging portion 810. In various embodiments, first pad region 818 may extend at least partially into limb engaging portion 808. Second pad region 820 may at least partially support dog's digital pads. Second pad region 820 may extend from the back 806 to the front 804. Second pad region 820 may extend from and between first ridges 809 and second ridges 851 (see FIG. 8C).

In various embodiments, first pad region 818 may comprise second ridges 851. In various embodiments, second ridges 851 may be a series of protrusions extending outwardly from body 802. In various embodiments, second ridges 851 may be space equally apart. In various embodiments, second ridges 851 may be spaced unequally apart such that a distance between each ridge 851 is greater toward the open end 812 than the distal end 814. In various embodiments, second ridges 851 may be spaced unequally apart such that a distance between each ridge 851 is greater toward the distal end 814 than the open end 812. In various embodiments, second ridges 851 may each be wider than the space between each ridge 851. In various embodiments, second ridges 851 may each be as wide as the space between each ridge 851. In various embodiments, second ridges 851 may each be less wide than the space between each ridge 851.

In various embodiments, the second ridges 851 may have a thickness of between 0.10 and 0.20 inches. In various embodiments, the second ridges 851 may have a thickness of between 0.13 and 0.17 inches. In various embodiments, the spaces between second ridges 851 may have a thickness of between 0.10 and 0.17 inches. In various embodiments, the spaces between second ridges 851 may have a thickness of between 0.11 and 0.14 inches. In other words, there may be grooves formed between second ridges 851 with a depth of between 0.001 and 0.10 inches. Grooves may have a depth of between 0.01 and 0.04 inches.

In various embodiments, second ridges 851 may assist with traction or protection of a dog's paw pads while second skin paw protector 800 is in use. In various embodiments, second ridges 851 may have the same pattern as first ridges 809. In various embodiments, second ridges 851 may have a different pattern than first ridges 809. In various embodiments, second ridges 851 may have a zig-zag design with a trough (that is, a low point pointing toward distal end 814) in the center of first pad region 818. In various embodiments, second ridges 851 may have a "zig-zag" design with troughs near each edge of first pad region 818. However, it is understood that while second ridges 851 are depicted in a "zig-zag" design, second ridges 851 may have any design. For example, second ridges 851 be substantially linear. As another example, second ridges 851 may have a continuous curvature. In various embodiments, second skin paw protector 800 is substantially smooth without second ridges 851.

In various embodiments, first pad region 818 of the second skin paw protector 800 is formed as a slip resistant region on the back 806 of the second skin paw protector 800. In various embodiments, first pad region 818 of the second skin paw protector 800 is formed as a wear resistant region on the back 806 of the second skin paw protector 800. In various embodiments, first pad region 818 and second ridges 851 have a thickness that does not exceed 0.25 inches. In various embodiments, first pad region 818 and second ridges 851 have a thickness that does not exceed 0.20 inches. In various embodiments, first pad region 818 and second ridges 851 have a thickness that does not exceed 0.16 inches. This allows the first pad region 818 to have high flexibility and high stretchability.

In various embodiments, paw engaging portion 810 has a non-uniform thickness. In various embodiments, a thickness T1 of the protrusion 816 is greater than a thickness T2 of the first pad region 818. In this manner, a thickness T2 of the paw engaging portion 810 gradually increases from the first pad region 818 to the protrusion 816. In various embodiments, protrusion 816 has a thickness T1 that does not exceed 0.30 inches. In various embodiments, protrusion 816 has a thickness T1 that does not exceed 0.25 inches. In various embodiments, protrusion 816 has a thickness T1 that does not exceed 0.20 inches.

In various embodiments, and with particular focus on FIGS. 8C-8E, the first pad region 818 of second skin paw protector 800 may act as a sole 850. The sole 850 may comprise a material configured to withstand the wear or walking or running on rugged surfaces. Accordingly, the first pad region 818, of the second skin paw protector 800 can lessen the rate of wear of the bottom of the second skin paw protector 800, which extends the useful life of the second skin paw protector 800. The sole 850 may be configured to be heat resistant and/or otherwise insulate the paw 20 from hot and/or cold ground surface temperatures. In various embodiments, the sole 850 is heat resistant up to about 400° C. The first pad region 818 can be located at pressure points like the metacarpal/metatarsal pad region and the digital pad region. This protects the bottom of the dog's paw 20 from damage or injury caused from contact with an exposed surface.

In various embodiments, the second pad region 820 wraps around the toe end 814 of the second skin paw protector 800. For example, the protrusion 816 is located at the toe end 814. The second pad region 820 can be increase in thickness, as described above, near the protrusion 816, which can increase the durability, and lessen the rate of wear, of the toe end 814. For example, the dog's nails can extend at least partially into the protrusion 816 and an increased thickness of the second pad region 820 near and throughout the protrusion 816 can protect the material of the body 802 from the dog's nails, thereby preventing rips, tears, and other wear of the material of the body 202.

In various embodiments, the second pad region 820 is configured to provide support and security to the paw 20 of the dog 10 while in use. The second pad region 820 can also act as a toe bumper 856 to protect the toes on the paw 20 of the dog 10 while second skin paw protector 800 is in use. The toe bumper 856 may extend upwardly from first pad region 818 so as to create a sidewall 857 around at least a portion of sole 250. Toe bumper 856 and sidewall 857 may also have an increased thickness, similar to protrusion 816. For example, while in use over rocky terrain, the second pad region 820 may provide cushioning, impact resistance, or other protection if the dog 10 hits its paw 20 or stubs its toe on an object.

In various embodiments, the first pad region 818, the second pad region 820, or both the first pad region 818 and the second pad region 820 have an enhanced slip resistance that is achieved by adding a grit material to the material. In various embodiments, the grit material is one of or a combination of sand, silicon carbide, and aluminum oxide. The grit material may have various levels of particle uniformity and particle average diameter. By adding a grit material to the polymer, the surface area of the first pad region 818 and the second pad region 820 is increased and the friction generated between a contacting surface, such as the ground, and the first pad region 818 and the second pad region 820 is correspondingly increased. As a result, the slip resistance of the first pad region 818 and the second pad region 820 and the second skin paw protector 800 is increased.

With reference to FIGS. 8B and 8C, second skin paw protector 800 may comprise a pair of slots 832. Slots 832 may be configured to receive a wrapping member, as a strap 838 and similar to strap 238, configured to wrap around the body 802, for through the slots 832. The strap 838 may be configured to secure the second skin paw protector 800 on the paw 20 and the leg 30 of the dog 10 (see FIG. 1B). The strap 838 can be configured to wrap around the dog's leg 30 to prevent the proximal end 812 of the body 802 from sliding down the dog's leg 30. The strap 838 can be configured to wrap around the leg 30 of the dog 10 above the dew claw and/or below the carpal pad. The strap 838 can be configured to wrap around the leg 30 of the dog 10 above the carpal pad. In use, the strap 838 can compress the proximal end 812 of the body 802 against the dog's leg. The strap 838 can be secured to itself and or the slots 832. The strap 838 can include magnets, snaps, buttons, hook and eye, and/or hook and loop portions configured to couple the strap 838 to itself. For example, strap 838 may have a hook portion 838*a* and a loop portion 838*b*. Loop portion 838*b* may be made from a resiliently stretchable fabric material. It is understood that the second skin paw protector 800 is optional for use of the second skin paw protector 800. In various embodiments, the second skin paw protector 800 may be worn on a dog's paw 20 with the strap 838. In various embodiments, the second skin paw protector 800 may be worn on a dog's paw 20 without the strap 838.

With reference to FIGS. 9A-9C, the second skin paw protector 800 may comprise a ribbed region 900. Ribbed region 900 may be disposed on an interior surface 834, or a radially inward surface, of second skin paw protector 800. In various embodiments, the ribbed region 900 may extend throughout at least a portion of the interior surface 834 of the body 802. In various embodiments, the ribbed region 900 may extend throughout at least a portion of the interior surface 834 of limb engaging portion 808. The ribbed region 900 may comprise at least one internal rib 901 protruding radially inward from the body 802. The ribbed region 900 may comprise more than one internal rib 901 protruding radially inward from the body 802. The number of internal ribs 901 may be selected based on a size of the second skin paw protector 800 or based on a breed of dog using the second skin paw protector 800. Each internal rib 901 may have a slanted face 902 slanted with respect to the interior surface 834 of limb engaging portion 808. The slanted face 902 may be facing the open end 812. Each internal rib 901 may have a perpendicular face 903 substantially perpendicular with respect to the interior surface 834 of limb engaging portion 808. The perpendicular face 903 may be facing the distal end 814. The slanted face 902 may be longer than the perpendicular face. In this manner, each internal rib 901 of the ribbed region may be configured to engage with a dog's limb 30 so as to prevent slippage of the second skin paw protector 800 during use. Specifically, each internal rib 901 may be configured to compress toward body 902 in response to body 802 moving in the positive Y direction with respect to the dog's limb 30 and to oppose movement of the body 802 in the negative Y direction with respect to the dog's limb 30.

In various embodiments, as depicted in FIG. 9A, where the ribbed region 900 meets the lip 831 of the collar 830, the internal ribs 901 may be interrupted to accommodate the lip 831 or the slots 832. In various embodiments, the ribbed region 900 may begin below (with respect to the open end 812) the interior surface 834 collar 830. In various embodiments, an interior rear wall 904 extends from the ribbed region 900 to the distal end 814 of the second skin paw protector 800. In various embodiments, the interior rear wall 904 is substantially smooth, that is, without topical features such as ridges or ribs.

Figures 10A, 10B, 10C:
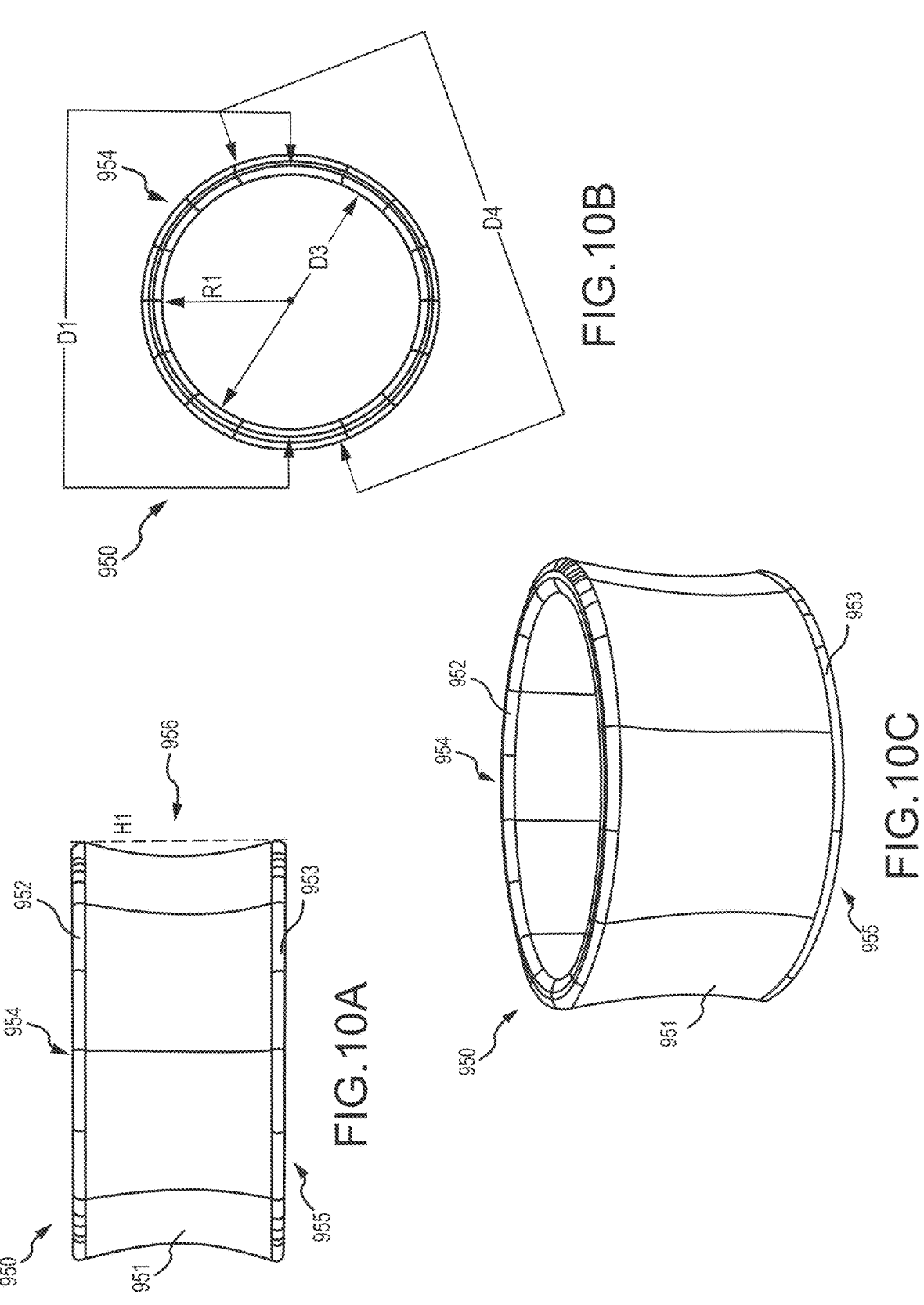
FIG. 10A and FIG. 10B illustrate a side view and a top view, respectively, of an applicator for a second skin paw protector, in accordance with various embodiments.
FIG. 10C illustrates an applicator for a second skin paw protector, in accordance with various embodiments.

In various embodiments, and with reference to FIGS. 10A-C, an applicator 950 is provided. Applicator 950 may be configured to assist in application of the second skin paw protector 800 to a dog's paw 20. Applicator 950 may be a ridged, cylindrical structure. Applicator 950 may be an annulus with a concave wall 951. With brief reference to FIGS. 11A-11C, concave wall 951 may aid in both retaining a stretched portion 960 of the second skin paw protector 800 and in gripping the second skin paw protector 800. With continued reference to FIGS. 10A-10C, concave wall 951 may comprise a curved top edge 952 at a proximal terminus 954. Concave wall 951 may comprise a curved bottom edge 953 at a distal terminus 955. The proximal terminus 954 may have a first inner diameter D1. The distal terminus 955 may have a second inner diameter D2. The first inner diameter D1 and the second inner diameter D2 may be equivalent. Concave wall 951 may comprise a midsection 956 at a point axially between the proximal terminus 954 and the distal terminus 955. Midsection 965 may be at a midpoint between the proximal terminus 954 and the distal terminus 955. The inner diameter of the applicator 950 may decrease toward the midsection 956 of the concave wall 951. Midsection 956 may have a third inner diameter D3 proportioned to fit comfortably around the largest circumference of a dog's limb 30. The concave wall 951 may also comprise a first outer diameter D4 at the proximal terminus 954 and a second outer diameter D5 at the distal terminus 955. The first outer diameter D4 and the second outer diameter D5 may be proportioned to correspond to the size of the second skin paw protector 800. A height H1 of the concave wall 951 may be approximately equivalent to a radius R1 of the applicator 950.

Figures 11A, 11B, 11C:
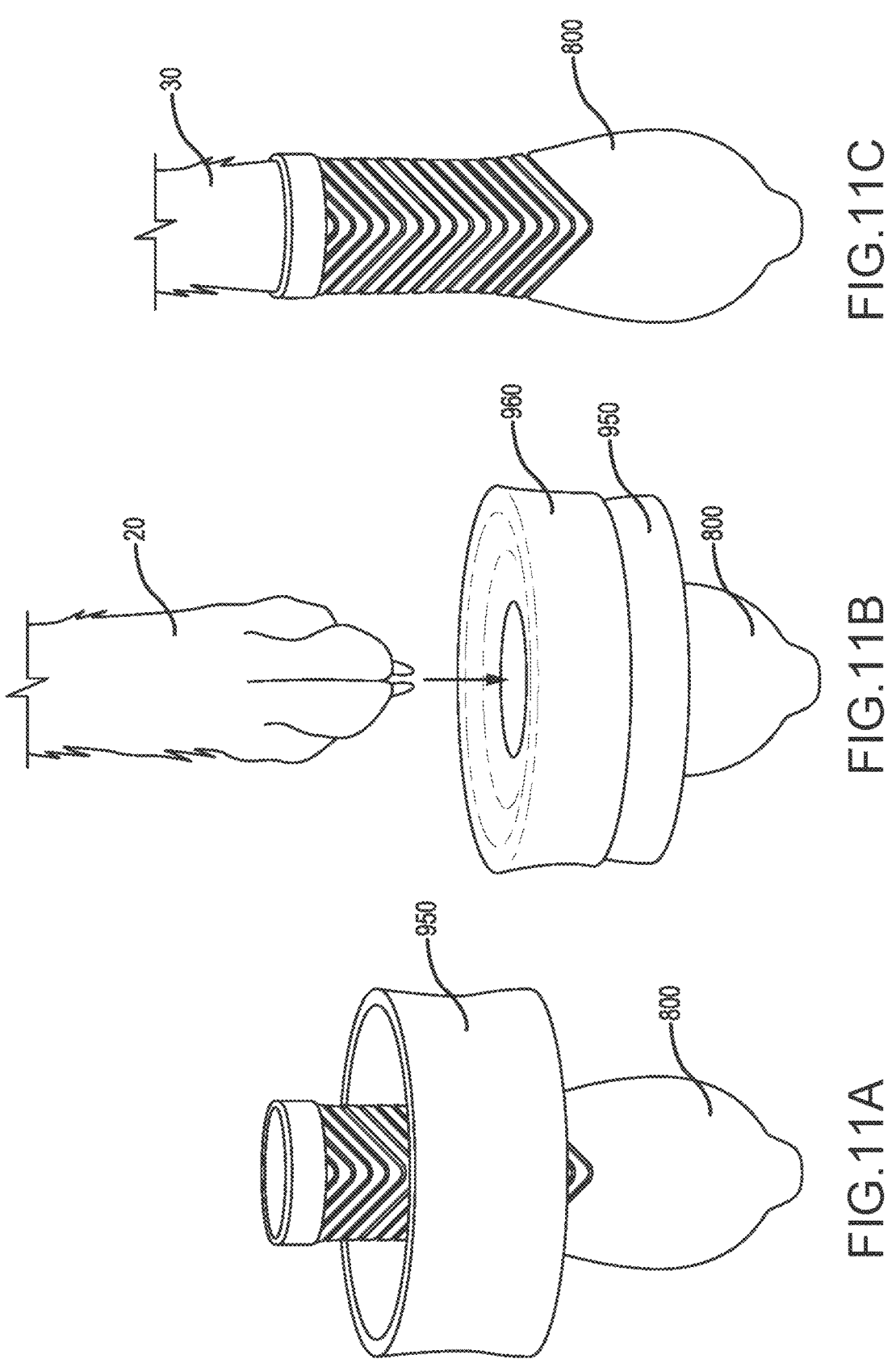
FIG. 11A, FIG. 11B, and FIG. 11C illustrate an applicator and use of an applicator, in accordance with various embodiments.

With reference to FIGS. 11A-11C and in various embodiments, applicator 950 may be configured to retain a second skin paw protector 800. The limb engaging portion 808 of the second skin paw protector 800 (including, for example, the collar 830, the lip 831, and the ribbed region 900) of the second skin paw protector 800 may be configured to stretch around applicator 950 forming a stretched portion 960. Stretched portion may be rolled onto applicator 950. Applicator 950 may be configured to retain the stretched portion 960 while a dog's paw 20 and limb 30 are inserted through the applicator 950 and into the paw engaging portion 810. In other words, the first outer diameter D1 and the second outer diameter D2 may be sized such that a portion of the second skin paw protector 800 may be stretched and secured around the concave wall 951. The second skin paw protector 800 may be retained around the concave wall 951 without additional force from, for example, a person holding the stretched portion 960. The stretched portion 960 may be deformed during retention but be resiliently deformable such that the second skin paw protector 800 returns to an unstretched position after removal of the applicator. In this manner, the applicator 950 may enable a person to use one hand to hold a dog's limb 30 and a second hand to hold and apply the second skin paw protector 800.

In various embodiments, the applicator 950 is configured to assist in unrolling the stretched portion 960 to engage the dog's limb 30. The applicator 950 retains the stretched portion 960 of the second skin paw protector 800 such that the second skin paw protector 950 may be applied to the appropriate portion of the dog's limb and fit comfortably around the dog's paw 20 and limb 30.

Figure 12:
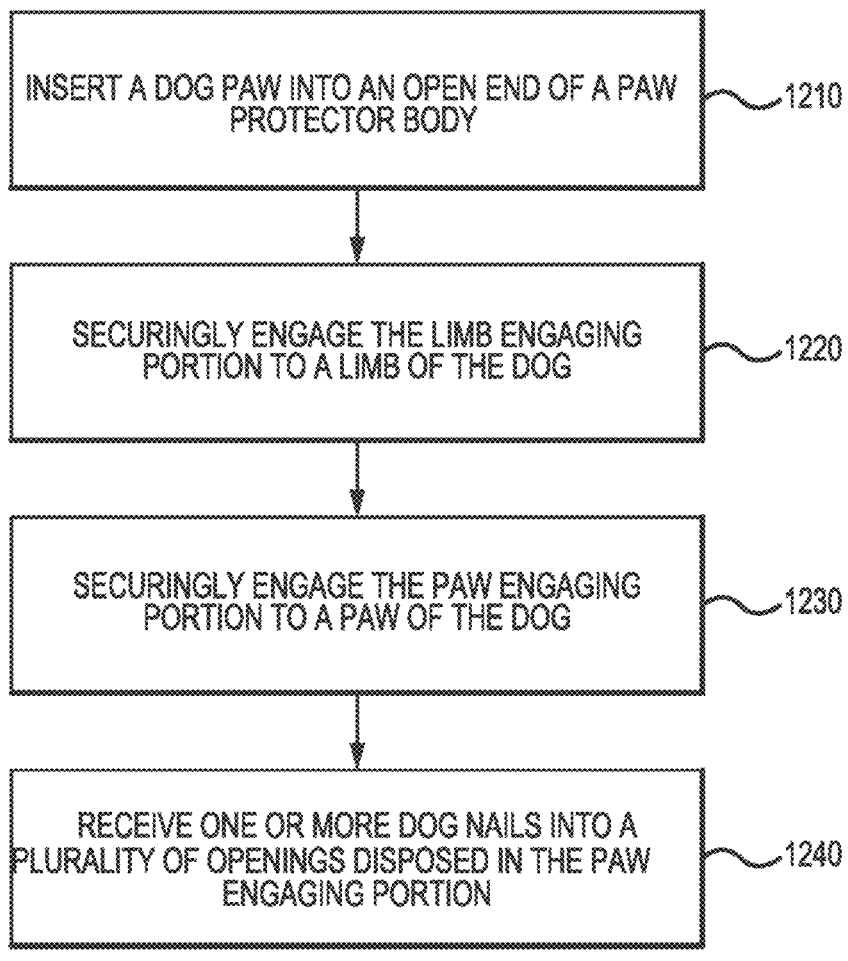
FIG. 12 illustrates a flow chart for a method of using a second skin paw protector, in accordance with various embodiments.

In various embodiments, referring to FIG. 12, a method 1200 of using a second skin paw protector 200 is provided. The method 1200 is described below with respect to FIG. 1A and FIG. 2A. The method 1200, however, is not limited in this regard and can be used in connection with any suitable pet shoe. In step 1210, the method 1200 may include inserting the paw 20 of the dog 10 into the open end 212 of the body 202 of the second skin paw protector 200. In step 1220, the method 1200 may include securely engaging the limb engaging portion 208 to the leg 30 of the dog 10. In step 1220, the method 1200 may include securely engaging the limb engaging portion 208 to the leg 30 of the dog 10. In step 1230, the method 1200 may include securely engaging the paw engaging portion 210 to the paw 20 of the dog 10. In step 1240, the method 1200 may include receiving one or more dog nails/claws into at least one opening 216 disposed in the paw engaging portion 210.

Figure 13:
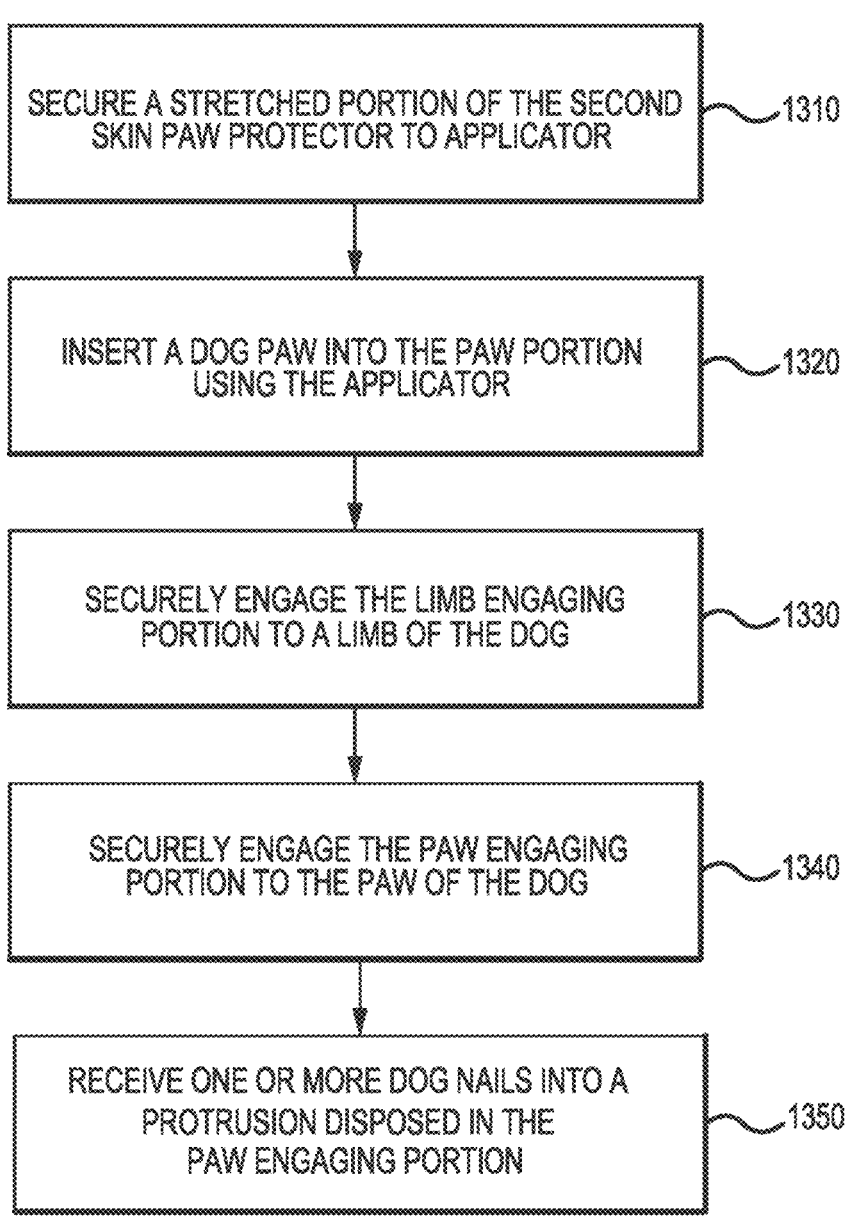
FIG. 13 illustrates a flow chart for a method of using a second skin paw protector, in accordance with various embodiments.

In various embodiments, referring to FIG. 13, a method 1300 of using a second skin paw protector 800 is provided. The method 1300 is described below with respect to FIG. 1B and FIGS. 11A-11C. The method 1200, however, is not limited in this regard and can be used in connection with any suitable pet shoe. In step 1310, the method 1300 may include securing a stretched portion 960 of the second skin paw protector 800 around an applicator 950. Stretched portion 960 may be secured by placing the applicator 950 around an outer circumference of the second skin paw protector 800 and stretching a collar 830 and at least a portion of a limb engaging portion 808 of the second skin paw protector 800 around an outer circumference of the applicator 950. In this manner, an outer surface of the second skin paw protector 800 may be in contact with an outer surface of the applicator 950, as depicted in FIG. 11B. In this manner, at least a portion of a paw engaging portion 810 of the second skin paw protector 800 is unstretched and accessible. In step 1320, the method 1300 may include inserting a dog's paw into the paw engaging portion 810. In step 1330, the method 1300 may include securely engaging the paw engaging portion 810 to the paw 20 of the dog 10. In step 1340, the method 1300 may include receiving one or more dog nails/claws into the protrusion 816 disposed in the paw engaging portion 210. In step 1350, the method 1300 may include removing the stretched portion 960 from the applicator and securely engaging the limb engaging portion 808 to the limb 30 of the dog 10.

In various embodiments, second skin paw protector 800 is formed by an injection molding process. An injection mold may comprise a set of dies. In various embodiments, the set of dies may comprise a first outer die, a second outer die, and at least one inner die. An outer contour of the inner die may correspond to the inner contour of the second skin paw protector 800. During the injection molding process, the inner die may be between the first outer die and the second outer die. Inner contours of the first outer die and the second outer die may, together, correspond to the outer contour of the second skin paw protector 800. In other words, the outer contour of the inner die may correspond to features such as the interior surface 834, internal ribs 902, interior rear wall 904, etc. The inner contours of the first outer die and the second outer die may correspond to features such as the first ridges 809, second ridges 851, collar 830, lip 831, etc. Slots 832 may be formed where a portion of at least one of the first outer die or the second outer die meet or abut the inner die.

During the injection molding process, the first outer die and the second outer die may be dimensioned and positioned as to create a space between the first outer die and the inner die as well as between the second outer die and the inner die. The space may correspond to the thickness of the second skin paw protector.

In this manner, an injection molding compound may be applied between the first outer die, the second outer die, and the inner die. The injection molding compound may be placed within a bottom die such that compression of the set of dies spreads the injection molding compound to fill the space. In various embodiments, the set of dies could first be closed together in a forming position and the injection molding compound may be injected into the system through a plurality of openings. In this manner, uniform injection throughout the space within and/or between the set of dies may be achieved.

In various embodiments, the injection molding compound may be primarily comprised of a polymer or co-polymer. For example, the injection molding compound may be primarily comprised of SEBS. The injection molding compound may include additional materials. In various embodiments, the injection molding compound may include the grit material (explained above). In various embodiments, the injection molding compound may include a glow in the dark or reflective material such as phosphorescent compounds, phosphorus-containing polymers, zinc sulfide, strontium aluminate, diketopyrrolopyrrole (DPP) based polymers, etc. In various embodiments, the injection molding compound may include a "mood material" or, more particularly, a thermo-responsive polymer, that is, a material that changes color in response to differing temperatures (ex: increases or decreases in response to temperature). The thermo-responsive polymer may be Poly(N-isopropylacrylamide) (PNIPAM), Poly(2-(dimethylamino)ethyl methacrylate) (pDMAEMA), Poly(vinylcaprolactam) (PVCL), liquid crystal polymers, etc. In various embodiments, the injection molding compound may comprise silver coated (e.g., nano particulate silver) nylon fibers, charcoal, and/or bamboo fibers to provide an antimicrobial barrier that deters fungus, bacteria and odor.

The injection molding compound may be heated or melted to a forming temperature while enclosed in the set of dies. Once uniform distribution of the injection molding compound at a forming temperature has been achieved, the injection molding compound may be cooled, for example, to room temperature. Once cooled, the injection molding compound is solid, but resiliently deformable (i.e. stretchy). After cooling, the set of dies may be opened. The second skin paw protector 800 is, thus, formed around the inner die and may be removed from the inner die.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A second skin paw protector, comprising:
a body monolithically formed from a first material and comprising:
a proximal end,
a distal end,
a limb engaging portion disposed at the proximal end and defining an interior volume configured to engage a dog limb,
a paw engaging portion disposed at the distal end and having a protrusion configured to receive at least one dog nail, wherein the limb engaging portion and the paw engaging portion join at a non-parallel angle, and
a plurality of ridges extending from the paw engaging portion to the limb engaging portion, the plurality of ridges including a plurality of first ridges having a first pattern, each first ridge extending laterally around the limb engaging portion, and including a second plurality of ridges having a second pattern different from the first pattern and extending laterally across a sole of the paw engaging portion.

2. The second skin paw protector of claim 1, wherein the first pattern of the plurality of first ridges is defined by a first trough disposed on a front of the limb engaging portion, a second trough disposed on a back of the limb engaging portion, a first peak on a first lateral side of the limb engaging portion, and a second peak on a second lateral side of the limb engaging portion.

3. The second skin paw protector of claim 2, wherein the second pattern of the plurality of second ridges is defined by a third peak disposed on the back of the limb engaging portion, a fourth peak disposed on the back of the limb engaging portion, and a third trough disposed therebetween.

4. The second skin paw protector of claim 3, wherein each of the plurality of first ridges and the plurality of second ridges are defined by a non-linear pattern.

5. The second skin paw protector of claim 1, wherein the sole further comprises a second material having at least one of a grit material, a glow in the dark material, or a thermo-responsive material.

6. The second skin paw protector of claim 1, wherein a circumference of the protrusion is smaller than a circumference of the paw engaging portion, and wherein a thickness of the protrusion is greater than a thickness of the paw engaging portion.

7. The second skin paw protector of claim 6, wherein a thickness of the paw engaging portion gradually increases from the sole to the protrusion.

8. The second skin paw protector of claim 1, further comprising a collar disposed at the proximal end and a lip extending from the collar along the limb engaging portion.

9. The second skin paw protector of claim 8, wherein a pair of slots is disposed on the lip, wherein each slot is configured to receive a wrapping member.

10. The second skin paw protector of claim 9, further comprising a wrapping member coupled to the body at the limb engaging portion, wherein the wrapping member is configured to be disposed through the pair of slots and to wrap around the body.

11. The second skin paw protector of claim 1, wherein the first material is Styrene-Ethylene-Butylene-Styrene (SEBS).

12. The second skin paw protector of claim 1, further comprising a ribbed region having at least one internal rib, wherein the at least one internal rib has a slanted face and a perpendicular face, the slanted face being disposed closer to the proximal end than the perpendicular face.

13. The second skin paw protector of claim 12, wherein the at least one internal rib is a plurality of internal ribs and wherein each slanted face is longer than each corresponding perpendicular face.

14. The second skin paw protector of claim 1, wherein an inner surface of the first pad region omits the plurality of ridges.

* * * * *